United States Patent
Liu et al.

(10) Patent No.: US 12,185,317 B2
(45) Date of Patent: Dec. 31, 2024

(54) RESOURCE CONFIGURATION METHOD AND APPARATUS

(71) Applicant: HUAWEI TECHNOLOGIES CO., LTD., Guangdong (CN)

(72) Inventors: Fengwei Liu, Chengdu (CN); Qiqi Mao, Shenzhen (CN); Shitong Yuan, Chengdu (CN); Jing Qiu, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 364 days.

(21) Appl. No.: 17/665,966

(22) Filed: Feb. 7, 2022

(65) Prior Publication Data

US 2022/0159642 A1 May 19, 2022

Related U.S. Application Data

(63) Continuation of application No. PCT/CN2020/104293, filed on Jul. 24, 2020.

(30) Foreign Application Priority Data

Aug. 7, 2019 (CN) .......................... 201910726198.4
Nov. 8, 2019 (CN) .......................... 201911089500.6

(51) Int. Cl.
*H04W 72/20* (2023.01)

(52) U.S. Cl.
CPC .................................. *H04W 72/20* (2023.01)

(58) Field of Classification Search
CPC . H04B 7/15542; H04L 5/0091; H04L 5/0094; H04L 5/1469; H04W 72/20
See application file for complete search history.

(56) References Cited

U.S. PATENT DOCUMENTS

2018/0035435 A1 2/2018 Gupta et al.
2021/0068086 A1* 3/2021 Behravan .............. H04L 5/0053

FOREIGN PATENT DOCUMENTS

CN 104363597 A 2/2015
CN 108111281 A 6/2018
(Continued)

OTHER PUBLICATIONS

AT&T, "Mechanisms for supporting access and backhaul link multiplexing," 3GPP TSG RAN WG1 #97, R1-1907155, Reno, USA, May 13-17, 2019, 11 pages.
(Continued)

*Primary Examiner* — Zhensheng Zhang
(74) *Attorney, Agent, or Firm* — Fish & Richardson P.C.

(57) ABSTRACT

This application provides example resource configuration methods, example apparatuses, and example computer-readable storage medium. One example method includes obtaining, by a distributed unit (DU) side of a first node, a first resource configuration and at least one second resource configuration, where the first resource configuration indicates the DU side of the first node to communicate with at least one of a terminal device or a second node by using the first resource configuration, the second resource configuration indicates the DU side of the first node to communicate with the second node by using the second resource configuration, the first node is a relay node, and the second node is a child node of the first node. The DU side of the first node can then communicate with the at least one of the terminal device or the second node.

18 Claims, 8 Drawing Sheets

(56) References Cited

FOREIGN PATENT DOCUMENTS

| CN | 110972266 | A | | 4/2020 | |
|----|-----------|---|---|--------|---|
| CN | 111436145 | A | | 7/2020 | |
| CN | 111867067 | A | * | 10/2020 | .......... H04W 72/042 |
| WO | 2018137700 | A1 | | 8/2018 | |

OTHER PUBLICATIONS

Ericsson, "IAB resource allocation and multiplexing," 3GPP TSG-RAN WG1 Meeting #95, R1-1813566, Spokane, USA, Nov. 12-16, 2018, 6 pages.

Extended European Search Report issued in European Application No. 20850106.4 on Aug. 29, 2022, 7 pages.

Huawei et al., "Resource multiplexing between backhaul and access in IAB," 3GPP TSG RAN WG1 Meeting #97, R1-1906001, Reno, USA, May 13-17, 2019, 9 pages.

3GPP TS 38.213 V15.6.0 (Jun. 2019), "3rd Generation Partnership Project; Technical Specification Group Radio Access Network; NR; Physical layer procedures for control (Release 15)," Jun. 2019, 107 pages.

Lenovo, Motorola Mobility, "Discussion on resource partitioning for IAB network," 3GPP TSG RAN WG1 Meeting #94, R1-1808551, Gothenburg, Sweden, Aug. 20-24, 2018, 3 pages.

PCT International Search Report and Written Opinion issued in International Application No. PCT/CN2020/104293 on Oct. 28, 2020, 17 pages (with English translation).

* cited by examiner

| First time unit | Second time unit | Third time unit | Fourth time unit |
|---|---|---|---|
| First resource configuration | First resource configuration | First resource configuration | Second resource configuration |

FIG. 7

| First time unit | Second time unit | Third time unit | Fourth time unit |
|---|---|---|---|
| First resource configuration | First resource configuration | First resource configuration | First resource configuration |
| Second resource configuration | Second resource configuration | Second resource configuration | Second resource configuration |

FIG. 8

Single periodicity

| D | D | D | D | D | D | F | F | U | U |
|---|---|---|---|---|---|---|---|---|---|

FIG. 9

| First periodicity | | | | | Second periodicity | | | | |
|---|---|---|---|---|---|---|---|---|---|
| D | D | D | F | U | D | D | F | U | U |

FIG. 10

| | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| First resource configuration | D | D | D | F | U | D | D | F | U | U | D | D | D | F | U | D | D | F | U | U |
| Resource type modification | | U | | | D | | U | | D | | | | | | | U | U | | D | D |
| Second resource configuration | D | U | D | F | D | D | U | F | D | U | D | D | D | F | U | U | U | F | D | D |

|←First periodicity→|←Second periodicity→|←Third periodicity→|←Fourth periodicity→|

FIG. 13

RESOURCE CONFIGURATION METHOD AND APPARATUS

CROSS-REFERENCE TO RELATED APPLICATIONS

This application is a continuation of International Application No. PCT/CN2020/104293, filed on Jul. 24, 2020, which claims priority to Chinese Patent Application No. 201910726198.4, filed on Aug. 7, 2019, and Chinese Patent Application No. 201911089500.6, filed on Nov. 8, 2019. All of the aforementioned patent applications are hereby incorporated by reference in their entireties.

TECHNICAL FIELD

This application relates to the communication field, and more specifically, to a resource configuration method and apparatus, and a computer-readable storage medium.

BACKGROUND

As mobile communication technologies continuously develop, spectrum resources become increasingly insufficient. To improve spectrum utilization, access network devices are deployed more densely in the future. In a conventional cellular network architecture, an access network device implements a connection between a terminal device and a core network by using an optical fiber. However, optical fiber deployment is costly in many scenarios. Therefore, an integrated access and backhaul (integrated access and backhaul node, IAB) technology may be used to implement a connection to the core network through a wireless backhaul link between a relay device and the access network device, to avoid high costs caused by deploying a large quantity of optical fibers.

In a long term evolution (LTE) system, to simplify a configuration and avoid interference of crossed links, a resource configuration of a relay device is consistent with a resource configuration of a terminal device that serves as a lower-level node of the relay device in the LTE system. However, in a new radio (NR) system, a resource configuration of a relay device is complex, and a function of multiplexing a plurality of resources may need to be supported. Consequently, the resource configuration of the relay device in the LTE system is not applicable to the NR system.

Therefore, how to configure a resource of the relay device in the NR system to enable the relay device to support the function of multiplexing a plurality of resources becomes a problem that needs to be urgently resolved currently.

SUMMARY

This application provides a resource configuration method and apparatus, and a computer-readable storage medium. In addition to supporting a function of multiplexing a plurality of resources, a first node may further ensure compatibility with an existing terminal device.

According to a first aspect, a resource configuration method is provided. The method includes: A distributed unit (DU) side of a first node obtains a first resource configuration and at least one second resource configuration, where the first resource configuration is used to indicate the DU side of the first node to communicate with a terminal device and/or a second node by using the first resource configuration, the second resource configuration is used to indicate the DU side of the first node to communicate with the second node by using the second resource configuration, the first node is a relay node, and the second node is a child node of the first node. The DU side of the first node communicates with the terminal device and/or the second node.

This application is applicable to a wireless communication system including a relay node. The relay node may be an IAB node, or may be a terminal device. The first node and the second node are relay nodes in the wireless communication system.

There are a plurality of implementations in which the DU of the first node obtains the at least one second resource configuration. This is not specifically limited in this application. In an example, the DU of the first node may directly receive the at least one second resource configuration from a third node. In another example, the DU of the first node may further generate the at least one second resource configuration based on the first resource configuration received from the third node. For example, a resource type in the first resource configuration may be modified to obtain the at least one second resource configuration.

It should be understood that the first resource configuration may also be referred to as a reference resource configuration, and is used by the DU of the first node to communicate with the terminal device, used by the DU of the first node to communicate with the second node, or used by the DU of the first node to communicate with the terminal device and the second node. The second resource configuration may be referred to as an additional resource configuration, and is used by the DU of the first node to communicate with the second node.

The second node is the child node of the first node, and the second node may include but is not limited to an IAB node and a special terminal device. Optionally, the special terminal device may be a terminal device supporting a specific NR protocol release, for example, a terminal device supporting the NR Release 17.

The terminal device may be a common terminal device. Optionally, the terminal device may be a terminal device supporting a protocol release such as the NR Release 15/16/17.

In the foregoing technical solution, the DU of the first node may obtain at least two DU resource configurations, and different DU resource configurations correspond to different users. Different user types are distinguished by using different resource configurations, so that the DU of the first node uses appropriate resource configurations when communicating with different users. In addition to supporting a function of multiplexing a plurality of resources, compatibility with existing UE may further be ensured.

In a possible implementation, that the DU side of the first node communicates with the terminal device and/or the second node includes one or more of the following: the DU side of the first node communicates with the terminal device in a first time unit based on the first resource configuration; the DU side of the first node communicates with the terminal device and/or the second node in the first time unit based on the first resource configuration; and the DU side of the first node communicates with the second node in the first time unit based on the second resource configuration.

In another possible implementation, a correspondence between the first time unit and the first resource configuration or the second resource configuration is preconfigured in advance.

In another possible implementation, the DU side of the first node receives the at least one second resource configuration sent by a third node, where the third node is a parent node or a donor node of the first node.

In another possible implementation, the DU side of the first node receives the first resource configuration sent by the third node.

In another possible implementation, the DU side of the first node receives first indication information from a third node, where the first indication information is used to indicate the DU side of the first node to modify a resource type in the first resource configuration.

In another possible implementation, the DU side of the first node modifies an uplink resource type in the first resource configuration to a downlink resource type or a flexible resource type based on the first indication information; modifies a downlink resource type in the first resource configuration to an uplink resource type or a flexible resource type; or modifies a flexible resource type in the first resource configuration to an uplink resource type or a downlink resource type.

In another possible implementation, the first indication information is further used to indicate to extend a configuration periodicity of the first resource configuration.

In the foregoing technical solution, index extension may be used to provide more configuration periodicities for the second resource configuration, to increase flexibility of the second resource configuration.

In another possible implementation, the DU side of the first node extends the configuration periodicity of the first resource configuration based on the first indication information, and the DU side of the first node modifies a resource type in an extended first resource configuration.

In another possible implementation, the DU side of the first node receives second indication information from the third node, where the second indication information is used to indicate the DU side of the first node to modify a resource type in a received original first resource configuration to an unavailable resource. Alternatively, the DU side of the first node receives third indication information from the third node, where the third indication information is used to indicate the DU side of the first node to modify a resource type in at least one received original second resource configuration to an unavailable resource.

In this application, the resource type in the first resource configuration and the resource type in the second resource configuration may be separately modified based on the second indication information, or the resource type in the first resource configuration and the resource type in the second resource configuration may be simultaneously modified based on the second indication information.

In another possible implementation, the second indication information is further used to indicate to extend a configuration periodicity of the received original first resource configuration, and the third indication information is further used to indicate to extend a configuration periodicity of the received original second resource configuration.

In another possible implementation, the method further includes: The DU side of the first node sends a child node resource configuration to the terminal device and/or the second node, where the child node configuration is generated by the DU side of the first node based on the first resource configuration and/or the second resource configuration.

In another possible implementation, the DU side of the first node selects, based on a user in a first user group, the first resource configuration to communicate with the user in the first user group, where the first user group includes the terminal device and/or the second node. Alternatively, the DU side of the first node selects, based on a user in a first user group, the second resource configuration to communicate with the user in the first user group, where the second user group includes only the second node.

In another possible implementation, the DU side of the first node includes N cells, the second resource configuration is configured for M cells, and M is a positive integer less than or equal to N.

The DU of the first node has a plurality of cells. In an example, the DU of the first node has panels or sectors in a plurality of directions, and different panels or sectors may be different cells. In another example, the DU of the first node uses a carrier aggregation manner, and different carriers may be different cells. One or more of the plurality of cells may obtain only the first resource configuration, or may obtain both the first resource configuration and the second resource configuration. This is not specifically limited in this application.

It should be understood that each cell may have an independent resource configuration, or may share a resource configuration.

According to a second aspect, a resource configuration apparatus is provided. The resource configuration apparatus may implement the resource configuration method described in any one of the first aspect or the possible implementations. For example, the resource configuration apparatus may be a first node.

According to a third aspect, a resource configuration apparatus is provided. The apparatus includes:

an obtaining module, configured to obtain a first resource configuration and at least one second resource configuration, where the first resource configuration is used to indicate a DU side of a first node to communicate with a terminal device and/or a second node by using the first resource configuration, the second resource configuration is used to indicate the DU side of the first node to communicate with the second node by using the second resource configuration, the first node is a relay node, and the second node is a child node of the first node; and a communication module, configured to communicate with the terminal device and/or the second node.

There are a plurality of implementations in which the DU of the first node obtains the at least one second resource configuration. This is not specifically limited in this application. In an example, the DU of the first node may directly receive the at least one second resource configuration from a third node. In another example, the DU of the first node may further generate the at least one second resource configuration based on the first resource configuration received from the third node. For example, a resource type in the first resource configuration may be modified to obtain the at least one second resource configuration.

It should be understood that the first resource configuration may also be referred to as a reference resource configuration, and is used by the DU of the first node to communicate with the terminal device, used by the DU of the first node to communicate with the second node, or used by the DU of the first node to communicate with the terminal device and the second node. The second resource configuration may be referred to as an additional resource configuration, and is used by the DU of the first node to communicate with the second node.

The second node is the child node of the first node, and the second node may include but is not limited to an IAB node and a special terminal device. Optionally, the special terminal device may be a terminal device supporting a specific NR protocol release, for example, a terminal device supporting the NR Release 17.

The terminal device may be a common terminal device. Optionally, the terminal device may be a terminal device supporting a protocol release such as the NR Release 15/16/17.

The foregoing resource configuration apparatus may obtain at least two DU resource configurations, and different DU resource configurations correspond to different users. Different user types are distinguished by using different resource configurations, so that the DU of the first node uses appropriate resource configurations when communicating with different users. In addition to supporting a function of multiplexing a plurality of resources, compatibility with existing UE may further be ensured.

In a possible implementation, the communication module is specifically configured to perform one or more of the following: communicating with the terminal device in a first time unit based on the first resource configuration; communicating with the terminal device and/or the second node in the first time unit based on the first resource configuration; and communicating with the second node in the first time unit based on the second resource configuration.

In another possible implementation, a correspondence between the first time unit and the first resource configuration or the second resource configuration is preconfigured in advance.

In another possible implementation, the obtaining module is specifically configured to receive the at least one second resource configuration sent by a third node, where the third node is a parent node or a donor node of the first node.

In another possible implementation, the obtaining module is specifically configured to receive first indication information from a third node, where the first indication information is used to indicate the DU side of the first node to modify a resource type in the first resource configuration.

In another possible implementation, the obtaining module is specifically configured to: modify an uplink resource type in the first resource configuration to a downlink resource type or a flexible resource type based on the first indication information; modify a downlink resource type in the first resource configuration to an uplink resource type or a flexible resource type; or modify a flexible resource type in the first resource configuration to an uplink resource type or a downlink resource type.

In another possible implementation, the first indication information is further used to indicate to extend a configuration periodicity of the first resource configuration.

In another possible implementation, the obtaining module is specifically configured to: extend the configuration periodicity of the first resource configuration based on the first indication information; and modify a resource type in an extended first resource configuration.

In another possible implementation, the obtaining module is specifically configured to receive second indication information from the third node, where the second indication information is used to indicate the DU side of the first node to modify a resource type in a received original first resource configuration to an unavailable resource.

Alternatively, the obtaining module is specifically configured to receive third indication information from the third node, where the third indication information is used to indicate the DU side of the first node to modify a resource type in at least one received original second resource configuration to an unavailable resource.

In this application, the resource type in the first resource configuration and the resource type in the second resource configuration may be separately modified based on the second indication information, or the resource type in the first resource configuration and the resource type in the second resource configuration may be simultaneously modified based on the second indication information.

In another possible implementation, the second indication information is further used to indicate to extend a configuration periodicity of the received original first resource configuration, and the third indication information is further used to indicate to extend a configuration periodicity of the received original second resource configuration.

In another possible implementation, the apparatus further includes:

a sending module, configured to send a child node resource configuration to the terminal device and/or the second node, where the child node configuration is generated by the DU side of the first node based on the first resource configuration and/or the second resource configuration.

In another possible implementation, the communication module is specifically configured to: select, based on a user in a first user group, the first resource configuration to communicate with the user in the first user group, where the first user group includes the terminal device and/or the second node; or select, based on a user in a first user group, the second resource configuration to communicate with the user in the first user group, where the second user group includes only the second node.

In another possible implementation, the DU side of the first node includes N cells, the second resource configuration is configured for M cells, and M is a positive integer less than or equal to N.

The DU of the first node has a plurality of cells. In an example, the DU of the first node has panels or sectors in a plurality of directions, and different panels or sectors may be different cells. In another example, the DU of the first node uses a carrier aggregation manner, and different carriers may be different cells. One or more of the plurality of cells may obtain only the first resource configuration, or may obtain both the first resource configuration and the second resource configuration. This is not specifically limited in this application.

It should be understood that each cell may have an independent resource configuration, or may share a resource configuration.

According to a fourth aspect, a resource configuration apparatus is provided. The resource configuration apparatus provided in this application has a function of implementing behavior of the first node in the foregoing method aspects, and includes corresponding components (means) configured to perform steps or functions described in the foregoing method aspects. The steps or the functions may be implemented by using software, hardware (for example, a circuit), or a combination of hardware and software. The apparatus may be a chip or the like.

In a possible design, the resource configuration apparatus includes one or more processors. The one or more processors are configured to support the apparatus in implementing corresponding functions of the first node in the foregoing methods, for example, obtain a first resource configuration and at least one second resource configuration.

Optionally, the resource configuration apparatus may further include one or more memories. The memory is configured to be coupled to the processor, and stores program instructions and/or data that are/is necessary for the apparatus. The one or more memories may be integrated with the processor, or may be disposed independent of the processor. This is not limited in this application.

Optionally, the resource configuration apparatus may further include one or more communication units, and the communication unit may be a transceiver or a transceiver circuit. Optionally, the transceiver may alternatively be an input/output circuit or an interface.

In another possible design, the resource configuration apparatus includes a transceiver, a processor, and a memory. The processor is configured to control the transceiver or the input/output circuit to receive and send a signal, and the memory is configured to store a computer program. The processor is configured to run the computer program in the memory, to enable the apparatus to perform the method completed by the first node according to any one of the first aspect or the possible implementations of the first aspect.

When the program is executed, the processor is configured to: obtain a first resource configuration and at least one second resource configuration through the transceiver, where the first resource configuration is used to indicate the DU side of the first node to communicate with a terminal device and/or a second node by using the first resource configuration, the second resource configuration is used to indicate the DU side of the first node to communicate with the second node by using the second resource configuration, the first node is a relay node, and the second node is a child node of the first node; and communicate with the terminal device and/or the second node.

In a possible implementation, the processor is specifically used, in one or more of the following cases, by the DU side of the first node to communicate with the terminal device in a first time unit based on the first resource configuration; by the DU side of the first node to communicate with the terminal device and/or the second node in the first time unit based on the first resource configuration; and by the DU side of the first node to communicate with the second node in the first time unit based on the second resource configuration.

There are a plurality of implementations in which the DU of the first node obtains the at least one second resource configuration. This is not specifically limited in this application. In an example, the DU of the first node may directly receive the at least one second resource configuration from a third node. In another example, the DU of the first node may further generate the at least one second resource configuration based on the first resource configuration received from the third node. For example, a resource type in the first resource configuration may be modified to obtain the at least one second resource configuration.

It should be understood that the first resource configuration may also be referred to as a reference resource configuration, and is used by the DU of the first node to communicate with the terminal device, used by the DU of the first node to communicate with the second node, or used by the DU of the first node to communicate with the terminal device and the second node. The second resource configuration may be referred to as an additional resource configuration, and is used by the DU of the first node to communicate with the second node.

The second node is the child node of the first node, and the second node may include but is not limited to an IAB node and a special terminal device. Optionally, the special terminal device may be a terminal device supporting a specific NR protocol release, for example, a terminal device supporting the NR Release 17.

The terminal device may be a common terminal device. Optionally, the terminal device may be a terminal device supporting a protocol release such as the NR Release 15/16/17.

The foregoing resource configuration apparatus may obtain at least two DU resource configurations, and different DU resource configurations correspond to different users. Different user types are distinguished by using different resource configurations, so that the DU of the first node uses appropriate resource configurations when communicating with different users. In addition to supporting a function of multiplexing a plurality of resources, compatibility with existing UE may further be ensured.

In another possible implementation, a correspondence between the first time unit and the first resource configuration or the second resource configuration is preconfigured in advance.

In another possible implementation, the processor receives, through the transceiver, the at least one second resource configuration sent by a third node, where the third node is a parent node or a donor node of the first node.

In another possible implementation, the processor receives, through the transceiver, the first resource configuration sent by the third node.

In another possible implementation, the processor receives first indication information from a third node through the transceiver, where the first indication information is used to indicate the DU side of the first node to modify a resource type in the first resource configuration.

In another possible implementation, the processor modifies an uplink resource type in the first resource configuration to a downlink resource type or a flexible resource type based on the first indication information; modifies a downlink resource type in the first resource configuration to an uplink resource type or a flexible resource type; or modifies a flexible resource type in the first resource configuration to an uplink resource type or a downlink resource type.

In another possible implementation, the first indication information is further used to indicate to extend a configuration periodicity of the first resource configuration.

In another possible implementation, the processor extends the configuration periodicity of the first resource configuration based on the first indication information; and modifies a resource type in an extended first resource configuration.

In another possible implementation, the processor receives second indication information from the third node through the transceiver, where the second indication information is used to indicate the DU side of the first node to modify a resource type in a received original first resource configuration to an unavailable resource. Alternatively, the processor receives third indication information from the third node through the transceiver, where the third indication information is used to indicate the DU side of the first node to modify a resource type in at least one received original second resource configuration to an unavailable resource.

In another possible implementation, the second indication information is further used to indicate to extend a configuration periodicity of the received original first resource configuration, and the third indication information is further used to indicate to extend a configuration periodicity of the received original second resource configuration.

In another possible implementation, the processor is further configured to send a child node resource configuration to the terminal device and/or the second node through the transceiver, where the child node configuration is generated by the DU side of the first node based on the first resource configuration and/or the second resource configuration.

In another possible implementation, the processor is configured to: select, based on a user in a first user group, the first resource configuration to communicate with the user in the first user group, where the first user group includes the terminal device and/or the second node. Alternatively, the DU side of the first node selects, based on a user in a first user group, the second resource configuration to communicate with the user in the first user group, where the second user group includes only the second node.

In another possible implementation, the DU side of the first node includes N cells, the second resource configuration is configured for M cells, and M is a positive integer less than or equal to N.

According to a fifth aspect, a computer-readable storage medium is provided and is configured to store a computer program. The computer program includes instructions used to perform the method in any one of the first aspect or the possible implementations of the first aspect.

According to a sixth aspect, a computer program product is provided. The computer program product includes computer program code. When the computer program code is run on a computer, the computer is enabled to perform the method in any one of the first aspect or the possible implementations of the first aspect.

BRIEF DESCRIPTION OF DRAWINGS

FIG. 7 shows a preconfigured time division mode according to an embodiment of this application;

FIG. 8 shows a dynamically configured time division mode according to an embodiment of this application;

FIG. 9 is a schematic diagram of a single-periodicity TDD resource configuration of a terminal device according to an embodiment of this application;

FIG. 10 is a schematic diagram of a dual-periodicity TDD resource configuration of a terminal device according to an embodiment of this application;

FIG. 13 is a schematic diagram of another possible second resource configuration according to an embodiment of this application;

DESCRIPTION OF EMBODIMENTS

Figure 1:
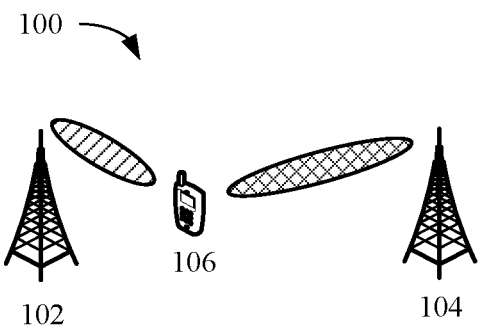
FIG. 1 is a schematic diagram of a scenario of a communication system 100 to which embodiments of this application are applicable.

The following describes technical solutions of this application with reference to accompanying drawings.

Technical solutions in the embodiments of this application may be applied to various communication systems, for example, a long term evolution (LTE) system, a worldwide interoperability for microwave access (WiMAX) communication system, a future 5th generation (5G) system such as a new generation radio access technology (new radio access technology, NR), and a future communication system such as a 6G system.

All aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be used.

In addition, the term "for example" in the embodiments of this application is used to represent giving an example, an illustration, or a description. Any embodiment or design scheme described as an "example" in this application should not be explained as being more preferred or having more advantages than another embodiment or design scheme. Exactly, the word "example" is used to present a concept in a specific manner.

In the embodiments of this application, information, a signal, a message, or a channel may be interchangeably used sometimes. It should be noted that expressed meanings are consistent when differences are not emphasized. "Relevant" and "corresponding" may be interchangeably used sometimes. It should be noted that expressed meanings are consistent when differences are not emphasized.

In the embodiments of this application, sometimes a subscript, for example, $W_1$, may be written in an incorrect form, for example, W1. Expressed meanings are consistent when differences are not emphasized.

A network architecture and a service scenario described in the embodiments of this application are intended to describe the technical solutions in the embodiments of this application more clearly, and do not constitute any limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

The embodiments of this application may be applied to a conventional typical network, or may be applied to a future user equipment (UE)-centric network. A non-cell network architecture is introduced to the UE-centric network. To be specific, a large quantity of small cells are deployed in a specific area to form a hyper cell. Each small cell is a transmission point (TP) or a transmission reception point (transmission and reception point, TRP) of the hyper cell, and is connected to a centralized controller. When UE moves in the hyper cell, a network side device selects a new sub-cluster for the UE in real time to serve the UE, to avoid a real cell handover, and implement UE service continuity. The network side device includes a wireless network device. Alternatively, in the UE-centric network, a plurality of network side devices such as small cells may have independent controllers such as distributed controllers. Each small cell can independently schedule a user, and information is exchanged between small cells for a long time, so that the small cell can provide a coordinated service for the UE flexibly to some extent.

In the embodiments of this application, different base stations may be base stations having different identifiers, or may be base stations that have a same identifier and that are deployed at different geographical locations. Before being deployed, a base station does not know whether the base station is related to a scenario to which the embodiments of this application are applied. Therefore, before being deployed, the base station or a baseband chip needs to support a method provided in the embodiments of this application. It may be understood that the foregoing base stations having different identifiers may have base station identifications, cell identifiers, or other identifiers.

In the embodiments of this application, an NR network scenario in a wireless communication network is used as an example to describe some scenarios. It should be noted that the solutions in the embodiments of this application may further be applied to another wireless communication network, and a corresponding name may also be replaced with a name of a corresponding function in the another wireless communication network.

For ease of understanding the embodiments of this application, a communication system shown in FIG. 1 is first used as an example to describe in detail a communication system to which the embodiments of this application are applicable. FIG. 1 is a schematic diagram of a communication system to which embodiments of this application are applicable. As shown in FIG. 1, the communication system 100 includes a network device 102 and a terminal device 106. The network device 102 may have a plurality of antennas, and the terminal device may also have a plurality of antennas. Optionally, the communication system may further include a network device 104, and the network device 104 may also have a plurality of antennas.

It should be understood that the network device 102 or the network device 104 may further include a plurality of components (for example, a processor, a modulator, a multiplexer, a demodulator, or a de-multiplexer) related to signal sending and receiving.

The network device is a device that has a wireless transceiver function or a chip that can be disposed in the device. The device includes but is not limited to an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP), a wireless relay node, a wireless backhaul node, a transmission point (for example, a transmission reception point (TRP) or a transmission point (TP)), and the like in a wireless fidelity (Wi-Fi) system. The device may alternatively be a gNB or a transmission point (TRP or TP) in a 5G, such as NR, system, one or a group of (including a plurality of antenna panels) antenna panels of a base station in a 5G system, a network node that constitutes a gNB or a transmission point, for example, a baseband unit (base band unit, BBU) or a distributed unit (DU), or the like.

In some deployments, the gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer is eventually converted into information at the PHY layer, or is converted from information at the PHY layer. Therefore, in this architecture, higher layer signaling such as RRC layer signaling or PHCP layer signaling may also be considered as being sent by the DU, or being sent by the DU and the RU. It may be understood that the network device may be a CU node, a DU node, or a device including the CU node and the DU node. In addition, the CU may serve as a network device in a radio access network RAN, or the CU may serve as a network device in a core network (CN). This is not limited herein.

The terminal device may also be referred to as user equipment (UE), an access terminal, a subscriber unit, a subscriber station, a mobile station, a remote station, a remote terminal, a mobile device, a user terminal, a terminal, radio communication equipment, a user agent, a user apparatus, or the like. In the embodiments of this application, the terminal device may be a mobile phone, a tablet computer (pad), a computer having a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application. In this application, a terminal device having a wireless transceiver function and a chip that can be disposed in the foregoing terminal device are collectively referred to as a terminal device.

As an example instead of a limitation, in the embodiments of this application, the terminal device may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn by a user or integrated into clothes or an accessory of a user. The wearable device is not only a hardware device, but also implements a powerful function through software support, a data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

In the communication system 100, the network device 102 and the network device 104 each may communicate with a plurality of terminal devices (for example, the terminal device 106 shown in the figure). The network device 102 and the network device 104 may communicate with one or more terminal devices similar to the terminal device 106. However, it should be understood that a terminal device communicating with the network device 102 and a terminal device communicating with the network device 104 may be the same or may be different. The terminal device 106 shown in FIG. 1 may simultaneously communicate with the network device 102 and the network device 104, but this shows only a possible scenario. In some scenarios, the terminal device may communicate with only the network device 102 or the network device 104. This is not limited in this application.

It should be understood that FIG. 1 is merely a simplified schematic diagram used as an example for ease of understanding. The communication system may further include another network device or another terminal device that is not shown in FIG. 1.

As mobile communication technologies continuously develop, spectrum resources become increasingly insufficient. To improve spectrum utilization, access network devices are deployed more densely in the future. In addition, dense deployment of access network devices can also avoid coverage holes. In a conventional cellular network architecture, an access network device implements a connection between a terminal device and a core network by using an optical fiber. However, optical fiber deployment is costly in many scenarios. Therefore, an integrated access and backhaul (integrated access and backhaul node, IAB) technology may be used to implement a connection to the core network through a wireless backhaul link between a relay device and the access network device, to avoid high costs caused by deploying a large quantity of optical fibers. The following describes in detail an application scenario to which embodiments of this application are applicable with reference to FIG. 2.

Figure 2:
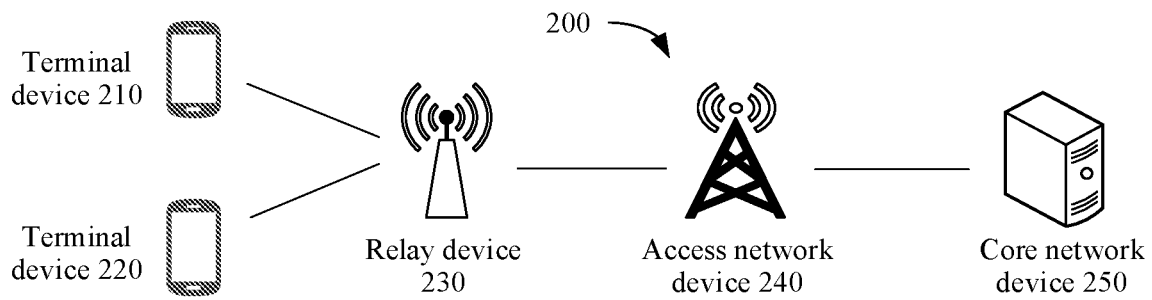
FIG. 2 is a schematic diagram of an architecture of a possible mobile communication system 200 having a relay device according to an embodiment of this application.

FIG. 2 is a schematic diagram of an architecture of a possible mobile communication system 200 having a relay device according to an embodiment of this application. As shown in FIG. 2, the mobile communication system 200 includes at least one terminal device (for example, a terminal device 210 and a terminal device 220 in FIG. 2), a relay device 230, an access network device 240, and a core network device 250.

The terminal device (for example, the terminal device 210 and the terminal device 220) may be connected to the relay device 230 in a wireless manner. One or more relay devices 230 may be connected to the access network device 240 in a wireless manner. Specifically, the one or more relay devices 230 may be directly connected to the access network device 240, or may be indirectly connected to the access network device 240 through another relay device. The access network device 240 may be connected to the core network device 250 in a wireless manner, or may be connected to the core network device 250 in a wired manner. This is not specifically limited in this embodiment of this application.

A type of the access network device 240 is not specifically limited in this embodiment of this application, and may be any device configured to communicate with the terminal device. The access network device 240 may be, for example, a base transceiver station (BTS) in a global system for mobile communications (GSM) system or a code division multiple access (CDMA) system, a NodeB (NB) in a wideband code division multiple access (WCDMA) system, an evolved NodeB (evolutional NodeB, eNB or eNodeB) in an LTE system, or a radio controller in a cloud radio access network (CRAN) scenario. Alternatively, the access network device 240 may be, for example, a relay station, an access point, a vehicle-mounted device, a wearable device, a network device in a future 5G network, or a network device in a future evolved PLMN network.

In a possible manner, because a future access network may be implemented by using a cloud radio access network (C-RAN) architecture, a protocol stack architecture and a function of a conventional access network device 140 are divided into two parts, one part is a CU, and the other part is a DU. One CU may be connected to one DU, or a plurality of DUs may share one CU, to reduce costs and facilitate network extension.

In addition, in this embodiment of this application, the access network device 240 may provide a service for a cell, and the terminal device communicates with the access network device 240 by using a transmission resource (for example, a frequency domain resource, namely, a spectrum resource) used in the cell. The cell may be a cell corresponding to the access network device 240 (for example, a base station). The cell may belong to a macro base station, or may belong to a base station corresponding to a small cell. The small cell herein may include a metro cell, a micro cell, a pico cell, a femto cell, and the like. These small cells are characterized by small coverage and low transmit power, and are applicable to providing a high-rate data transmission service.

A type of the core network device 250 is not specifically limited in this embodiment of this application. In an example, in a 4G system, the core network device 250 may be an evolved packet core network (EPC), and includes functional entities such as a serving gateway (S-GW) and a mobility management entity (MME) of a mobile terminal. In another example, in a 5G system, the core network device 250 may be a next generation core network (NGC), and includes functional entities such as a session management function (SMF) and an access and mobility management function (AMF) to provide functions such as authentication and mobility management for a mobile terminal.

The core network device 250 and the access network device 240 may be independent and different physical devices, functions of the core network device 250 and logical functions of the access network device 240 may be integrated into a same physical device, or some functions of the core network device 250 and some functions of the access network device 2140 may be integrated into one physical device. The terminal device may be at a fixed location, or may be mobile.

A quantity of core network devices 250, a quantity of access network devices 2140, a quantity of relay devices 230, and a quantity of terminal devices included in the mobile communication system 200 are not limited in this embodiment of this application.

The access network device 240 and the terminal device may be deployed on land, including an indoor device, an outdoor device, a handheld device, or a vehicle-mounted device; may be deployed on water; or may be deployed on an airplane, a balloon, and a satellite in the air. Application scenarios of the access network device 240 and the terminal device are not limited in the embodiments of this application.

Communication between the access network device 240 and the terminal device and communication between the terminal devices may be performed by using a licensed spectrum, an unlicensed spectrum, or both a licensed spectrum and an unlicensed spectrum. Communication between the access network device 240 and the terminal device and communication between the terminal devices may be performed by using a spectrum below 6 gigahertz (GHz), may be performed by using a spectrum above 6 GHz, or may be performed by using both a spectrum below 6 GHz and a spectrum above 6 GHz. A spectrum resource used between the access network device 240 and the terminal device is not limited in this embodiment of this application.

The relay device 230 may be referred to as an IAB node, may be referred to as a relay node (RN), or may be referred to as a relay transmission reception point (relay transmitting receiving point, RTRP). This is not specifically limited in this application. The relay device 230 may forward data and/or signaling between the terminal device and the access network device 240.

For ease of description, the relay device is referred to as an IAB node in the following to describe the embodiments of this application.

Figure 3:
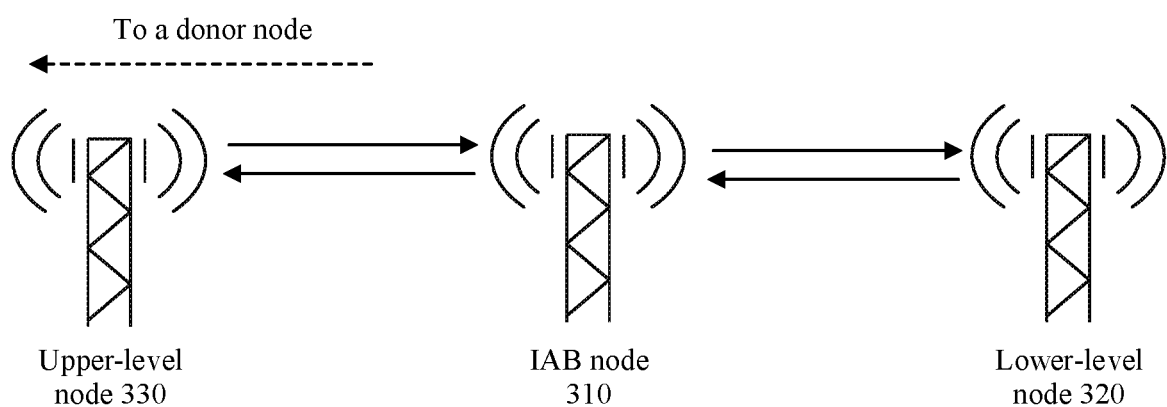
FIG. 3 is a schematic diagram of an upper level and a lower level of an IAB node according to an embodiment of this application.

In an example, the relay device 230 may include one or more IAB nodes. Refer to FIG. 3. An IAB node 310 may establish a wireless backhaul link to one or more lower-level nodes 320, and access a donor base station through the one or more upper-level nodes 330. Similarly, one IAB node may provide services for one or more lower-level nodes.

It should be understood that the donor base station may be an access network element having a complete base station function, or may be an access network element in a form in which a centralized unit (CU) and a distributed unit (DU) are separated. The donor base station may also be referred to as an IAB donor or a donor node. In a new radio (RN) system (or referred to as a 5G system), the donor base station may be a donor gNodeB (DgNB). In an LTE system (or referred to as a 4G system), the donor base station may be a donor eNodeB (DeNB). Certainly, the donor base station may also be referred to as a gNB or an eNB for short. An example in which the donor base station is the access network device 240. One IAB node may access the access network device 240 through one or more upper-level nodes and is connected to the core network device 250, and the access network device 240 provides a wireless access function for the IAB node.

Types of the upper-level node and the lower-level node are not specifically limited in the embodiments of this application. An upper-level node of one IAB node 310 may be a donor base station, or may be another IAB node. A lower-level node of one IAB node 310 may be a terminal device, or may be another IAB node.

A link for communication between the IAB node 310 and the upper-level node may be referred to as a parent backhaul link (parent BH link). A link for communication between the IAB node 310 and the lower-level IAB node may be referred to as a child backhaul link (child BH link). A link for communication between the IAB node 310 and a lower-level terminal device may be referred to as an access link. Optionally, in some embodiments, the child backhaul link (child BH link) may also be referred to as an access link.

It should be noted that, in some embodiments, the upper-level node may also be referred to as an upstream node or a parent node. The lower-level node may be referred to as a downstream node or a child node. This is not specifically limited in this application.

For example, as a parent node, the IAB node 310 may serve as an access network device similar to a base station, and provide a service for the lower-level node of the IAB node 310 by using a plurality of types of signaling on an available air interface resource managed by the donor base station. The service may include but is not limited to data scheduling, timing modulation, power control, and the like. For example, as a child node, the IAB node 310 may serve as a terminal device for a parent node that provides a service for the IAB node 310, access a wireless network like the terminal device, and perform a function of the terminal device. The IAB node 310 establishes a connection to the parent node and obtains the service provided by the parent node for the IAB node 310 through operations such as cell selection and random access.

Figure 4:
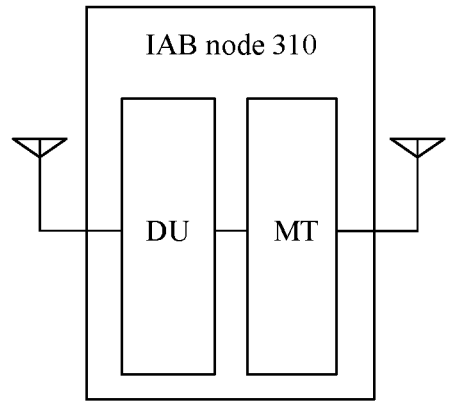
FIG. 4 is a schematic diagram of a structure of a possible IAB node 310 according to an embodiment of this application.

As an example instead of a limitation, a schematic diagram of a structure of the IAB node 310 is that shown in FIG. 4. A part of the IAB node 310 that performs the function of the terminal device may be referred to as a mobile terminal (MT) side or an MT functional module, and the IAB node 310 communicates with an upper-level node through an MT. A part of the IAB node 310 that serves as the access network device similar to the base station is referred to as a distributed unit (DU) side or a DU functional module, and the IAB node 310 may communicate with a lower-level node through a DU. The MT and the DU of the IAB node both may have complete transceiver modules, and there is an interface between the MT and the DU.

It should be noted that the MT and the DU are logical modules. In practice, the MT and the DU may share some submodules, for example, may share a transceiver antenna and a baseband processing module.

In a communication process, air interface resources of the backhaul link and the access link of the IAB node need to be configured by the donor base station or the upper-level node. A resource configuration of the IAB node may include an MT resource configuration and a DU resource configuration. The MT resource configuration is used to indicate a resource configuration used when the MT of the IAB node communicates with the upper-level node, and an MT resource of the IAB node may be set to three types: uplink (U), downlink (D), and flexible (F). The DU resource configuration is used to indicate a resource configuration used when the DU of the IAB node communicates with the lower-level node, and a DU resource of the IAB node may be set to four types: uplink (U), downlink (D), flexible (F), and null (N). The DU resource configuration of the IAB node is indicated by the upper-level node or the donor base station by using interface signaling.

According to a DU resource configuration method of an IAB node provided in the embodiments of this application, in addition to supporting a function of multiplexing a plurality of resources, the IAB node may further ensure compatibility with existing UE. The following describes in detail the method provided in the embodiments of this application with reference to FIG. 4.

Figure 5:
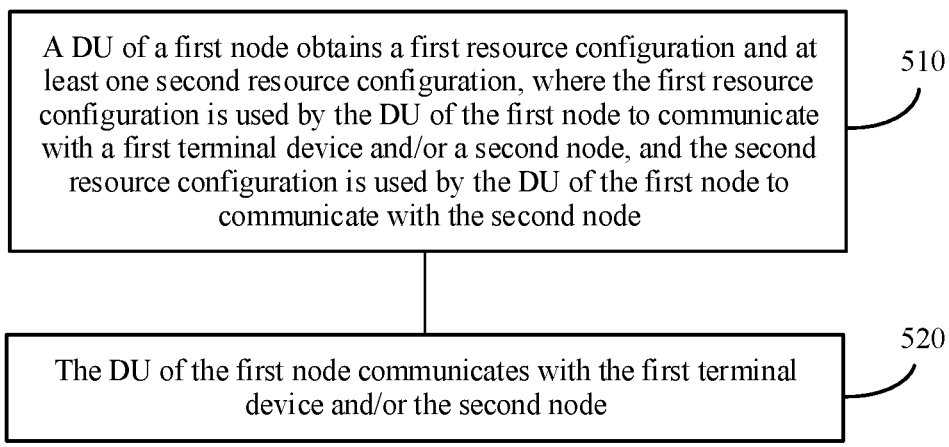
FIG. 5 is a schematic flowchart of a resource configuration method according to an embodiment of this application.

FIG. 5 is a schematic flowchart of a resource configuration method according to an embodiment of this application. As shown in FIG. 5, the method may include steps 510 and 520. The following separately describes steps 510 and 520 in detail.

Step 510: A DU of a first node obtains a first resource configuration and at least one second resource configuration, where the first resource configuration is used by the DU of the first node to communicate with a terminal device and/or a second node, and the second resource configuration is used by the DU of the first node to communicate with the second node.

It should be understood that the DU of the first node may correspond to the DU of the IAB node in the foregoing descriptions.

This embodiment of this application is applicable to a wireless communication system including a relay node. The relay node may be an IAB node, or may be a terminal device. The first node and the second node are relay nodes in the wireless communication system.

In this embodiment of this application, the DU of the first node may obtain the first resource configuration from a third node, where the third node may be a parent node or a donor node of the first node. The first resource configuration may be directly configured by the third node for the first node. For example, the third node directly sends first resource configuration information to the first node by using an interface message (for example, F1 application process protocol (application process, F1-AP) interface signaling). Optionally, the first node may implicitly infer the first resource configuration information from remaining information. For example, the first node infers the first resource configuration information based on a time division duplex (time division duplexing, TDD) broadcast or unicast configuration sent by the third node.

There are a plurality of implementations in which the DU of the first node obtains the at least one second resource configuration. This is not specifically limited in this embodiment of this application. In an example, the DU of the first node may directly receive the at least one second resource configuration from the third node. In another example, the DU of the first node may further generate the at least one second resource configuration based on the first resource configuration received from the third node. For example, a resource type in the first resource configuration may be modified to obtain the at least one second resource configuration. The following provides detailed descriptions with reference to a specific embodiment, and details are not described herein again.

The first resource configuration in this embodiment of this application may also be referred to as a reference resource configuration, and is used by the DU of the first node to communicate with the terminal device, used by the DU of the first node to communicate with the second node, or used by the DU of the first node to communicate with the terminal device and the second node. The second resource configuration may be referred to as an additional resource configuration, and is used by the DU of the first node to communicate with the second node.

It should be understood that the second node is a child node of the first node, and the second node may include but is not limited to an IAB node and a special terminal device. Optionally, the special terminal device may be a terminal device supporting a specific NR protocol release, for example, a terminal device supporting the NR Release 17.

It should be further understood that the terminal device may be a common terminal device. Optionally, the terminal device may be a terminal device supporting a protocol release such as the NR Release 15/16/17.

Figure 6:
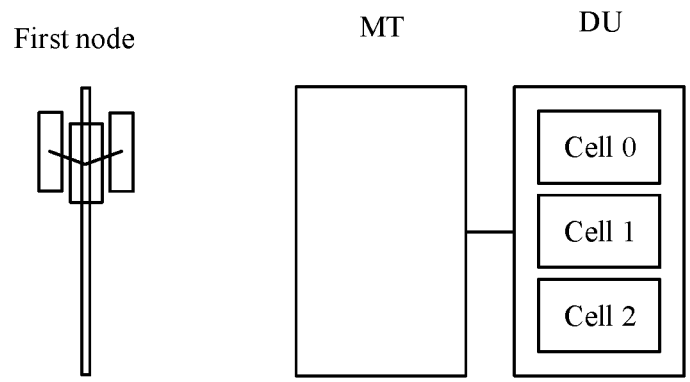
FIG. 6 is a schematic diagram of a structure of a first node having a plurality of cells according to an embodiment of this application.

Optionally, in some embodiments, the DU of the first node has a plurality of cells. In an example, the DU of the first node has panels or sectors in a plurality of directions, and different panels or sectors may be different cells. In another example, the DU of the first node uses a carrier aggregation manner, and different carriers may be different cells. An example in which the DU of the first node shown in FIG. 6 has a plurality of cells is used. The left figure shows a possible form of the first node having plurality of cells, that is, the first node has three antenna panels in different directions, and each panel is one cell. The right figure shows a schematic diagram of a structure of a DU having a plurality of cells and an MT.

In an embodiment in which the DU of the first node has the plurality of cells, one or more of the plurality of cells may obtain only the first resource configuration, or may obtain both the first resource configuration and the second resource configuration. This is not specifically limited in this application.

It should be noted that in this embodiment of this application, each cell may have an independent resource configuration, or may share a resource configuration. For ease of description, this embodiment of this application mainly describes a resource configuration of a cell in the DU of the first node.

Step 520: The DU of the first node communicates with the terminal device and/or the second node.

That the DU of the first node communicates with the terminal device and/or the second node may include one or more of the following cases: The DU of the first node communicates with the terminal device based on the first resource configuration. The DU of the first node communicates with the terminal device and/or the second node based on the first resource configuration. The DU of the first node communicates with the second node based on the second resource configuration. That is, the DU of the first node may select different resource configurations for communication based on a user type of a lower-level node of the first node. For example, when the lower-level node of the first node is a terminal device, the DU of the first node may communicate with the terminal device based on the first resource configuration. For another example, when the lower-level node of the first node is the second node, the DU of the first node may communicate with the second node based on the first resource configuration, or the DU of the first node may further communicate with the second node based on the second resource configuration.

In this embodiment of this application, the DU of the first node may obtain at least two DU resource configurations, and different DU resource configurations correspond to different users. Different user types are distinguished by using different resource configurations, so that the DU of the first node uses appropriate resource configurations when communicating with different users. In addition to supporting a function of multiplexing a plurality of resources, compatibility with existing UE may further be ensured.

Optionally, in some embodiments, after the DU of the first node obtains the first resource configuration and the second resource configuration, the first resource configuration and the second resource configuration may have opposite slots or symbols. Therefore, the DU of the first node cannot simultaneously use the first resource configuration and the second resource configuration. In this embodiment of this application, the DU of the first node may use the first resource configuration and the second resource configuration in a time division manner.

In an example, the first resource configuration and the second resource configuration may be preconfigured time division modes. That is, a correspondence between the first resource configuration, the second resource configuration, and a time unit is preconfigured in advance. For example, with reference to FIG. 7, in a first time unit, a second time unit, or a third time unit, the DU of the first node may communicate with the lower-level node based on the first resource configuration, and in the third time unit, the DU of the first node may communicate with the lower-level node based on the second resource configuration. The DU of the first node may select, based on the user type of the lower-level node, a resource configuration for communicating with a user, and communicate with the lower-level node in a corresponding time unit by using the resource configuration.

In another example, the first resource configuration and the second resource configuration may be dynamically configured. In other words, the DU of the first node may perform communication in one time unit by using either of the first resource configuration and the second resource configuration. For example, with reference to FIG. 8, the first resource configuration and the second resource configuration coexist in each time unit, and a resource configuration specifically used by the DU of the first node at each moment depends on a lower-level node communicating with the DU of the first node. The first time unit is used as an example. If the DU of the first node communicates with the terminal device, the DU of the first node may select, in the first time unit, the first resource configuration from two resource configurations to communicate with the terminal device.

In a possible implementation, a preconfiguration time division mode and a dynamic configuration time division mode may coexist. To be specific, correspondences between the first resource configuration, the second resource configuration, and some time units are preconfigured in advance, and the first resource configuration and the second resource configuration are dynamically selected by the DU in some time units.

In a possible implementation, the first node needs to send or receive a cell-level physical channel/signal (including a synchronization signal block (SSB), a physical broadcast channel (PBCH), or a random access channel (RACH)) in some time units. If a resource configuration conflicts with the cell-level physical channel and/or channel, the resource configuration is not used in this time unit. Optionally, in a time unit in which the first node sends or receives the cell-level physical signal/channel, the first node uses only a specific resource configuration, for example, only the first resource configuration. For example, if the first node needs to send an SSB in a time unit, the first resource configuration indicates that the time unit is in a downlink direction, and the second resource configuration indicates that the time unit is in an uplink direction, the first node can use only the first resource configuration in the time unit.

It should be understood that the time unit in this application may be a slot or a symbol, or may be a TDD pattern periodicity. This is not specifically limited in this application.

In this embodiment of this application, the DU of the first node may select different resource configurations for communication based on the user type of the lower-level node of the first node. As an example instead of a limitation, the DU of the first node may group lower-level nodes communicating with the first node, and use different types of resource configurations for different user groups. There are a plurality of specific implementations for grouping the lower-level nodes. This is not specifically limited in this application.

In an example, the terminal device belongs to a user group 1, and the second node belongs to a user group 2. When communicating with a user in the user group 1, the DU of the first node uses the first resource configuration. When communicating with a user in the user group 2, the DU of the first node uses the second resource configuration.

In another example, the terminal device belongs to a user group 1, and the second node belongs to a user group 2. When communicating with a user in the user group 1, the DU of the first node uses the first resource configuration. When communicating with a user in the user group 2, the DU of the first node may use the first resource configuration, or may use the second resource configuration.

In another example, the terminal device and the second node belong to a user group 1 by default, and an upper-level node or a donor node of the first node may configure some second nodes in the user group 1 to belong to a user group 2. When communicating with a user in the user group 1, the DU of the first node uses the first resource configuration. When communicating with a user in the user group 2, the DU of the first node may use the first resource configuration, or may use the second resource configuration.

In another example, the terminal device belongs to a user group 1, and the second node belongs to a user group 2 by default. An upper-level node or a donor node of the first node may configure some second nodes in the user group 1 to belong to the user group 2, or configure some second nodes in the user group 2 to belong to the user group 1. When communicating with a user in the user group 1, the DU of the first node uses the first resource configuration. When communicating with a user in the user group 2, the DU of the first node may use the first resource configuration, or may use the second resource configuration.

In another example, users may be further divided into three groups. A user in a user group 1 can communicate with the DU of the first node only by using the first resource configuration. A user in a user group 2 can communicate with the DU of the first node only by using the second resource configuration. A user in a user group 3 can communicate with the DU of the first node by using the first resource configuration, or can communicate with the DU of the first node by using the second resource configuration.

It should be understood that the foregoing grouping information may be sent by the third node to the first node, or may be generated by the first node. Optionally, when the grouping information is generated by the first node, the first node reports the grouping information to the third node.

In a possible implementation, when sending the second resource configuration to the first node, the third node also indicates an identifier of a node to which the configuration is applicable, in other words, the third node indicates specific nodes with which the first node may communicate by using the configuration. Optionally, the third node may also indicate a resource configuration that should be used by each second node to the first node.

In a possible implementation, the third node sends more than one second resource configuration to one cell of the first node.

In this embodiment of this application, the first resource configuration is used for communication between the DU of the first node and the terminal device. To be compatible with an existing terminal device, the first resource configuration is compatible with a resource configuration received by the terminal device.

For ease of describing the first resource configuration, time division duplex (time division duplexing, TDD) is used as an example, and a TDD resource configuration of the terminal device is first described.

The terminal device may receive a TDD resource configuration broadcast by an access network device in remaining minimum system information (RMSI) or a system information block (system information blocks, SIB 1). The broadcast TDD resource configuration starts from a downlink (D) symbol/slot and ends with an uplink (U) symbol/slot, and there may be a plurality of flexible (F) symbols/slots between the downlink symbol/slot and the uplink symbol/slot.

It should be understood that, after completing cell synchronization and obtaining a master system information block (master information block, MIB) message, the terminal device further needs to obtain some other necessary system messages, so that the terminal device camps on a cell and can initiate random access. In an NR system, these necessary system messages are referred to as RMSI at a physical layer and are referred to as SIBs 1 at an RRC layer.

It should be further understood that after the access network device broadcasts signaling, the access network device may further continue to update the TDD resource configuration of the terminal device by using unicast signaling. Specifically, the access network device may update the TDD resource configuration for the terminal device by using RRC signaling. In an existing NR protocol, the unicast RRC signaling can modify only an F slot or symbol configured in the broadcast signaling. In addition, the access network device may further update a slot configuration of the terminal device by using dynamic signaling. Similarly, only a flexible slot or symbol indicated by previous signaling can be modified by using the configuration.

The broadcast TDD resource configuration received by the terminal device may have a single-pattern periodicity, or may have a dual-pattern periodicity. With reference to FIG. 9 and FIG. 10, a slot-level resource configuration is used as an example to describe the TDD resource configuration of the terminal device. It should be noted that the example in FIG. 9 is merely intended to help a person skilled in the art understand the embodiments of this application, instead of limiting the embodiments of this application to a specific value or a specific scenario shown in the example. A person skilled in the art can definitely make various equivalent modifications or changes based on the example shown in FIG. 9, and such modifications and changes also fall within the scope of the embodiments of this application.

It should be noted that the single-pattern periodicity may have one TDD configuration pattern. The dual-pattern periodicity may have two TDD configuration patterns, and a periodicity is separately configured for each TDD configuration pattern.

Refer to FIG. 9. A broadcast TDD resource configuration received by the terminal device has a single periodicity in which 10 slots are used as an example. The first six slots are downlink slots, the last two slots are uplink slots, and the seventh slot and the eighth slot are flexible slots.

Refer to FIG. 10. A broadcast TDD resource configuration received by the terminal device has dual periodicities in which 10 slots are used as an example. In a first periodicity, the first three slots are downlink slots, the last slot is an uplink slot, and the fourth slot is a flexible slot. In a second periodicity, the first two slots are downlink slots, the last two slots are uplink slots, and the third slot is a flexible slot.

The first resource configuration in this embodiment of this application is compatible with the resource configuration received by the terminal device. In an example, the first resource configuration may use the resource configuration received by the terminal device as a reference, and a periodicity value of the first resource configuration should be the same as a periodicity value of the resource configuration received by the terminal device, to ensure that the first resource configuration matches the resource configuration received by the terminal device. For example, the first resource configuration may match the resource configuration received by the terminal device. For details, refer to the possible resource configuration received by the terminal device described in FIG. 9 and FIG. 10. In another example, more patterns may further be introduced in the first resource configuration based on the resource configuration received by the terminal device. The following provides detailed descriptions with reference to FIG. 11.

Figure 11:
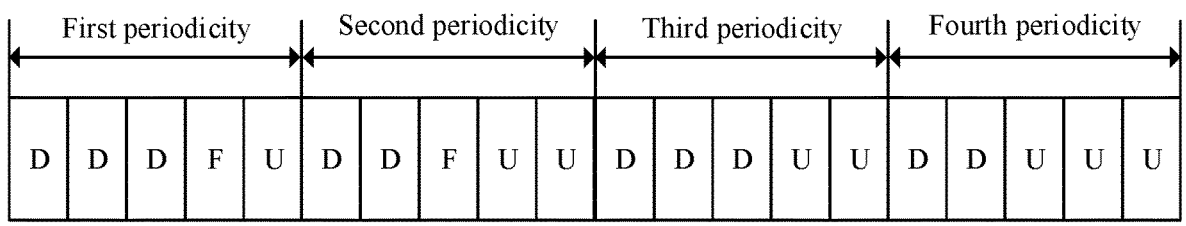
FIG. 11 is a schematic diagram of a possible first resource configuration according to an embodiment of this application.

FIG. 11 is a schematic diagram of a possible first resource configuration according to an embodiment of this application. As shown in FIG. 11, four patterns are introduced in the first resource configuration based on the TDD resource configuration received by the terminal device in FIG. 10.

Refer to FIG. 11. The first resource configuration has four patterns: a first pattern, a second pattern, a third pattern, and a fourth pattern respectively. A periodicity corresponding to the first pattern is referred to as a first periodicity, a periodicity corresponding to the second pattern is referred to as a second periodicity, a periodicity corresponding to the third pattern is referred to as a third periodicity, and a periodicity corresponding to the fourth pattern is referred to as a fourth periodicity.

In FIG. 11, in the first periodicity, the first three slots are downlink slots, the last slot is an uplink slot, and the fourth slot is a flexible slot. In the second periodicity, the first two slots are downlink slots, the last two slots are uplink slots, and the third slot is a flexible slot. In the third periodicity, the first three slots are downlink slots, and the last two slots are uplink slots. In the fourth periodicity, the first two slots are downlink slots, and the last three slots are uplink slots.

The first resource configuration in FIG. 11 is introduced based on the TDD resource configuration received by the terminal device in FIG. 10. Therefore, to implement that the first resource configuration matches the TDD resource configuration received by the terminal device, a resource configuration in the first periodicity of the first resource configuration matches that in the first periodicity of the TDD resource configuration of the terminal device in FIG. 10, and a resource configuration of the second periodicity in the first resource configuration matches that in the second periodicity of the TDD resource configuration of the terminal device in FIG. 10. In addition, to avoid a conflict between the first resource configuration and the TDD resource configuration received by the terminal device in a slot, a resource configuration in the third periodicity of the first resource configuration matches the resource configuration in the first periodicity, and a resource configuration in the fourth periodicity of the first resource configuration matches the resource configuration in the second periodicity.

It should be noted that a flexible slot may be modified to an uplink slot or a downlink slot. Therefore, in FIG. 11, the resource configuration in the third periodicity of the first resource configuration matches the resource configuration in the first periodicity of the first resource configuration, and the resource configuration in the fourth periodicity of the first resource configuration matches the resource configuration in the second periodicity of the first resource configuration.

It should be further noted that when the resource configuration has four pattern periodicities, for example, the first resource configuration has four periodicities: the first periodicity, the second periodicity, the third periodicity, and the fourth periodicity respectively, to match a pattern periodicity of the terminal device, usually, first periodicity+second periodicity=third periodicity+fourth periodicity; or the first periodicity is equal to the third periodicity, and the second periodicity is equal to the fourth periodicity.

In this embodiment of this application, the second resource configuration may be directly sent by an upper-level node or a donor node, or the DU of the first node may generate the second resource configuration based on the first resource configuration. The second resource configuration may be configured in the foregoing single-pattern manner, or may be configured in a multi-pattern (for example, more than or equal to two patterns) manner. The following describes in detail a specific implementation process in which the DU of the first node generates the second resource configuration.

As an example instead of a limitation, the DU of the first node may modify the resource type in the first resource configuration based on the first resource configuration and resource type modification indication information that is sent by the upper-level node or the donor node, to obtain the second resource configuration.

Figure 12:
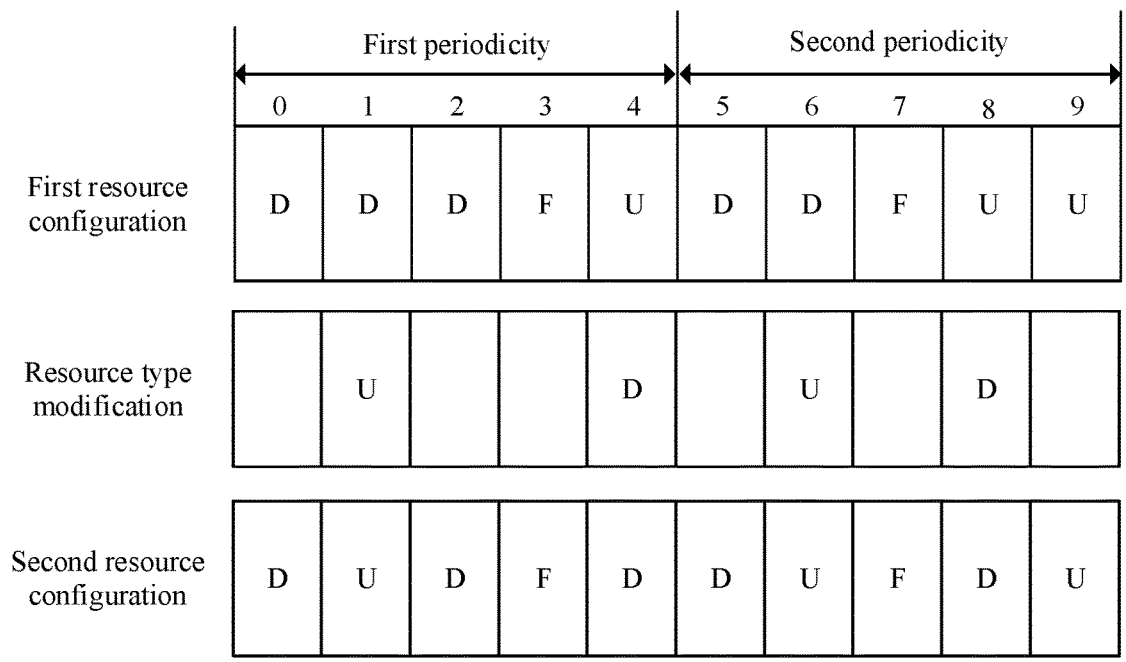
FIG. 12 is a schematic diagram of a possible second resource configuration according to an embodiment of this application.

With reference to FIG. 12, the following describes in detail, by using the first resource configuration shown in FIG. 10 as an example, a specific implementation process in which the DU of the first node generates the second resource configuration based on the first resource configuration. It should be noted that the example in FIG. 12 is merely intended to help a person skilled in the art understand the embodiments of this application, instead of limiting the embodiments of this application to a specific value or a specific scenario shown in the example. A person skilled in the art can definitely make various equivalent modifications or changes based on the example shown in FIG. 12, and such modifications and changes also fall within the scope of the embodiments of this application.

Refer to FIG. 12. A slot/symbol that needs to be modified is indicated by using an index in a periodicity. For example, two periodicities of the first resource configuration each include five slots, and slots that need to be modified may be indicated by using slot numbers ranging from 0 to 9. In this way, the first resource configuration and the second configuration periodicity may specifically have a same pattern quantity and periodicity.

Specifically, the resource type modification indication information is used to indicate to: modify a type of a slot 1 in the first resource configuration to an uplink (U) slot, modify a type of a slot 4 in the first resource configuration to a downlink (D) slot, modify a type of a slot 6 to an uplink slot, and modify a type of a slot 8 to a downlink slot. The DU of the first node may modify the first resource configuration based on the first resource configuration and the resource type modification indication information, to obtain the second resource configuration shown in FIG. 12.

Optionally, in some embodiments, a pattern length of the second resource configuration may be further increased by extending a slot index. In this way, more pattern quantities may be introduced into the second resource configuration, thereby increasing flexibility of the second resource configuration. For example, it is assumed that a quantity of slots included in the first resource configuration is K, and a possible value of the slot index ranges from 0 to (K−1). A value range of the slot index may be increased by H times, so that a value of the slot index ranges from 0 to (HK−1), and a quantity of slots included in a modified first resource configuration is increased by H times. In this way, the second resource configuration is generated based on the modified first resource configuration, and the pattern length of the second resource configuration may be increased.

With reference to FIG. 13, the following describes in detail, by using the first resource configuration shown in FIG. 12 as an example, a specific implementation process of generating the second resource configuration based on the first resource configuration whose quantity of slots is increased. It should be noted that the example in FIG. 13 is merely intended to help a person skilled in the art understand the embodiments of this application, instead of limiting the embodiments of this application to a specific value or a specific scenario shown in the example. A person skilled in the art can definitely make various equivalent modifications or changes based on the example shown in FIG. 13, and such modifications and changes also fall within the scope of the embodiments of this application.

Refer to FIG. 13. Two periodicities of the first resource configuration each include five slots, a total of 10 slots (that is, M=10) are included, and a value range of a slot index of the two periodicities is 0 to 9. It is assumed that the range of the slot index is increased by two times, that is, the first resource configuration includes four periodicities, and a value range of the slot index of the four periodicities is modified to 0 to 19.

Specifically, the resource type modification indication information is used to indicate to: modify a type of a slot 1 in the first resource configuration to an uplink (U) slot, modify a type of a slot 4 in the first resource configuration to a downlink (D) slot, modify a type of a slot 6 to an uplink slot, modify a type of a slot 8 to a downlink slot, modify a type of a slot 15 to an uplink slot, modify a type of a slot 16 to an uplink slot, modify a type of a slot 18 to a downlink slot, and modify a type of a slot 19 to a downlink slot. The DU of the first node may modify the first resource configuration based on the first resource configuration and the resource type modification indication information, to obtain the second resource configuration shown in FIG. 13. In this way, a quantity of patterns of the second resource configuration may be modified to 4, to increase flexibility of the second resource configuration.

The foregoing describes a configuration of an available resource in the second resource configuration, for example, an uplink resource, a downlink resource, and a flexible resource. The following describes in detail a method for configuring an unavailable resource in the second resource configuration with reference to FIG. 14 and FIG. 15.

As an example instead of a limitation, the DU of the first node may modify a resource type in the second resource configuration to an unavailable resource type based on the resource type modification indication information sent by the upper-level node or the donor node, to obtain a modified second resource configuration (that is, the second resource configuration including the unavailable resource type).

Figure 14:
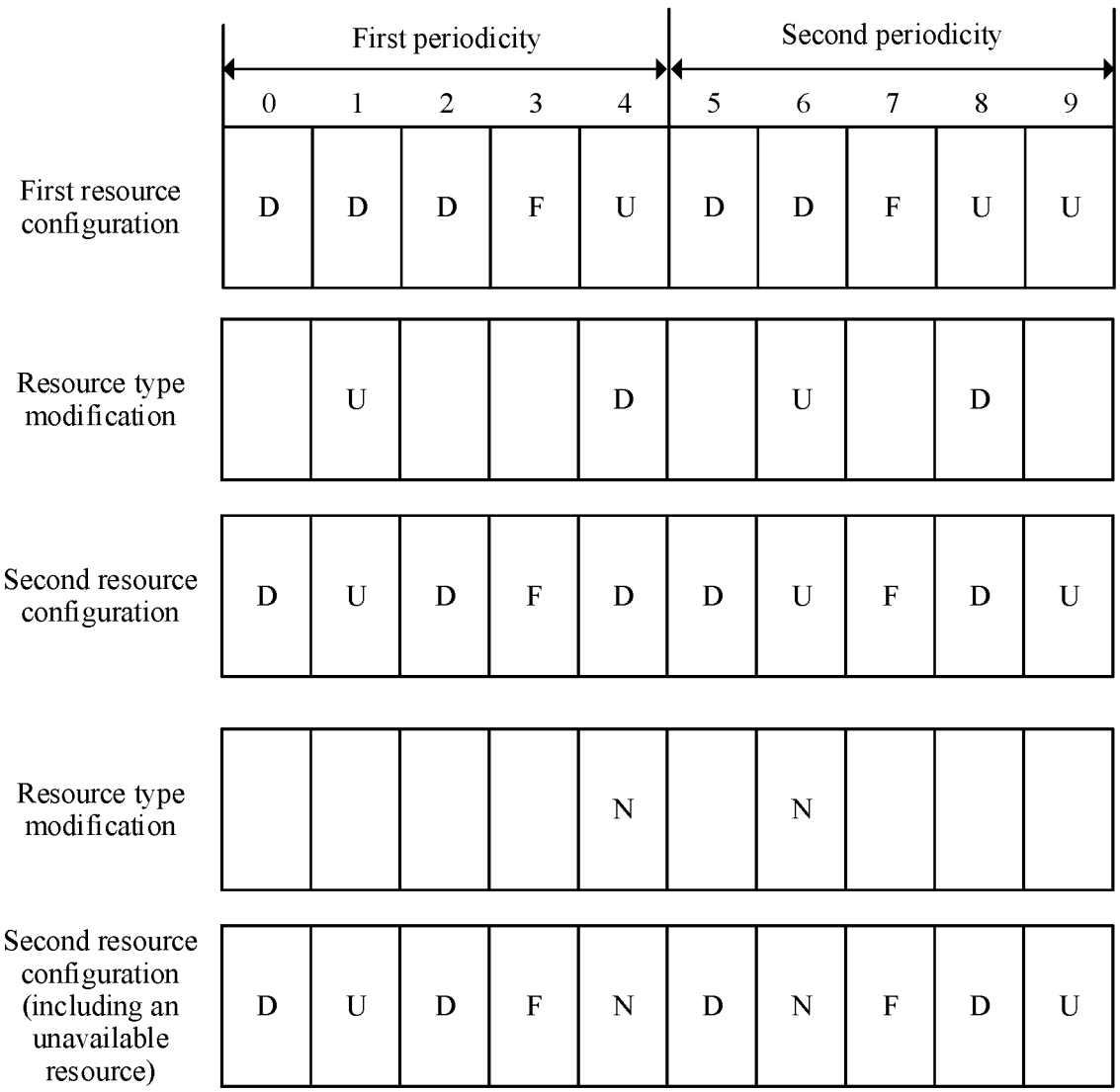
FIG. 14 is a schematic diagram of a possible second resource configuration including an unavailable resource according to an embodiment of this application.

With reference to FIG. 14, the following describes in detail, by using the second resource configuration shown in FIG. 12 as an example, a specific implementation process in which the DU of the first node modifies a resource type in the second resource configuration to an unavailable resource. It should be noted that the example in FIG. 14 is merely intended to help a person skilled in the art understand the embodiments of this application, instead of limiting the embodiments of this application to a specific value or a specific scenario shown in the example. A person skilled in the art can definitely make various equivalent modifications or changes based on the example shown in FIG. 14, and such modifications and changes also fall within the scope of the embodiments of this application.

Refer to FIG. 14. A slot/symbol that needs to be modified is indicated by using an index in a periodicity. For example, two periodicities of the second resource configuration each include five slots, and slots that need to be modified may be indicated by using slot numbers 0 to 9.

Specifically, the resource type modification indication information is used to indicate to modify resource types of a slot 4 and a slot 6 in the second resource configuration to unavailable resources. For example, "N" in FIG. 14 indicates an unavailable resource. The DU of the first node may modify the second resource configuration based on the second resource configuration and the resource type modification indication information, to obtain the second resource configuration including the unavailable resources shown in FIG. 14. When the DU of the first node communicates with the lower-level node based on the second resource configuration including the unavailable resources, the DU of the first node cannot communicate with the lower-level node on the unavailable resources in the slot 4 and the slot 6.

Optionally, in some embodiments, a resource type in the second resource configuration may be further modified to an unavailable resource type on the second resource configuration whose pattern length is increased, to obtain a modified second resource configuration (that is, the second resource configuration including the unavailable resource type).

Figure 15:
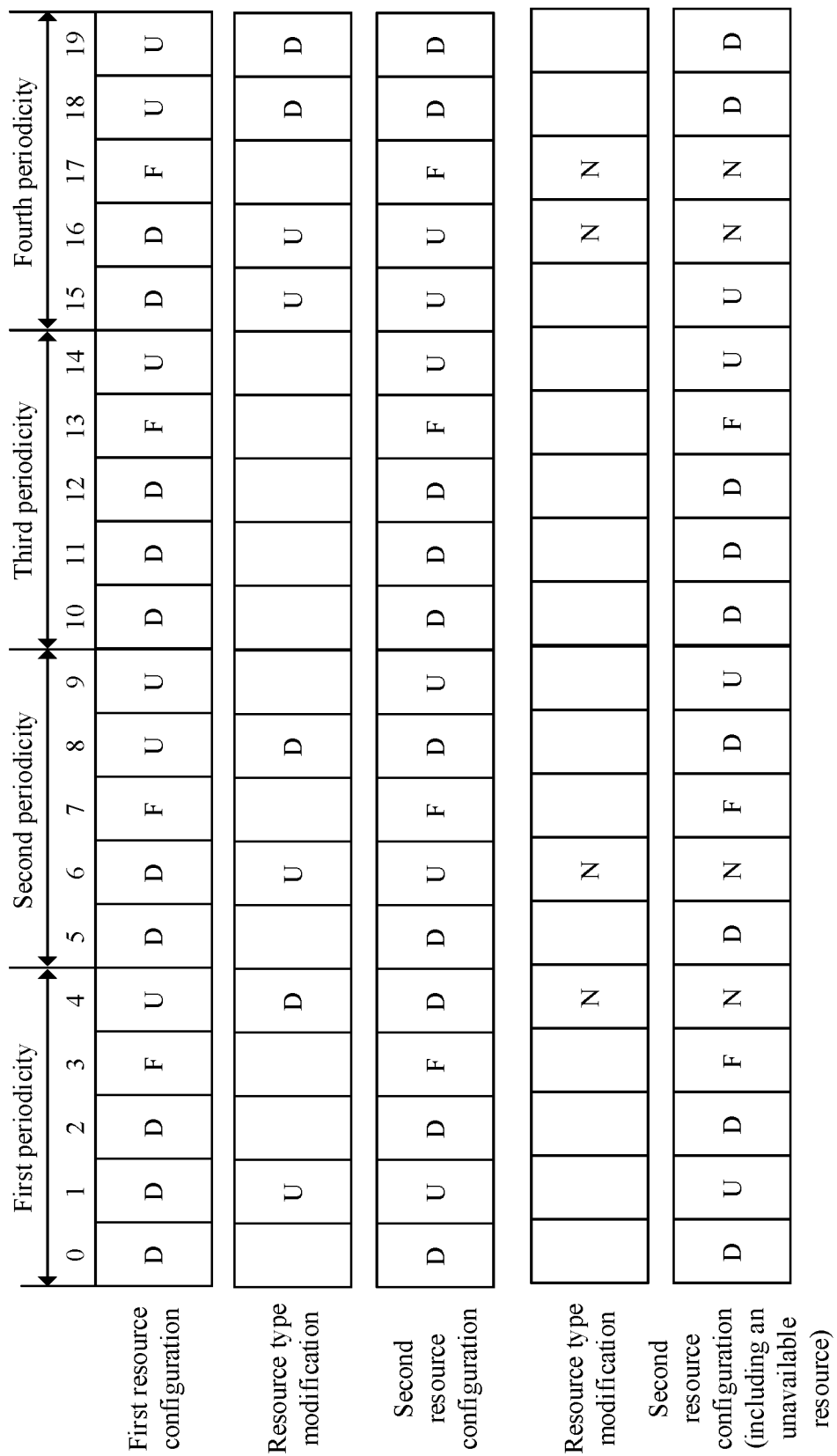
FIG. 15 is a schematic diagram of another possible second resource configuration including an unavailable resource according to an embodiment of this application.

With reference to FIG. 15, the following describes in detail, by using the second resource configuration shown in FIG. 13 as an example, a specific implementation process in which the DU of the first node modifies a resource type in the second resource configuration to an unavailable resource. It should be noted that the example in FIG. 15 is merely intended to help a person skilled in the art understand the embodiments of this application, instead of limiting the embodiments of this application to a specific value or a specific scenario shown in the example. A person skilled in the art can definitely make various equivalent modifications or changes based on the example shown in FIG. 15, and such modifications and changes also fall within the scope of the embodiments of this application.

Refer to FIG. 15. A slot/symbol that needs to be modified is indicated by using an index in a periodicity. For example, it is assumed that a range of the slot index is increased by two times, that is, the first resource configuration includes four pattern periodicities, and a value range of the slot index of the four pattern periodicities is modified to 0 to 19. In this case, the second resource configuration includes four pattern periodicities, and a value range of the slot index of the four pattern periodicities is 0 to 19.

Specifically, the resource type modification indication information is used to indicate to modify resource types of a slot 4, a slot 6, a slot 16, and a slot 17 in the second resource configuration to unavailable resources. For example, "N" indicates an unavailable resource in FIG. 15. The DU of the first node may modify the second resource configuration based on the second resource configuration and the resource type modification indication information, to obtain the second resource configuration including the unavailable resources shown in FIG. 15. When the DU of the first node communicates with the lower-level node based on the second resource configuration including the unavailable resources, the DU of the first node cannot communicate with the lower-level node on the unavailable resources in the slot 4, the slot 6, the slot 16, and the slot 17.

It should be noted that a configuration of the unavailable resource may be separately for the first resource configuration and the second resource configuration, or is applicable to both the first resource configuration and the second resource configuration. This is not specifically limited in this embodiment of this application.

It should be further noted that the uplink resource, the downlink resource, and the flexible resource in the DU resource configuration of the first node may further be classified into two types: a hard resource and a soft resource, the hard resource indicates a resource that is always available to the DU, and the soft resource indicates that whether to be available to the DU depends on an indication of the upper-level node or the donor node. The foregoing unavailable resource configuration method is also applicable to a hard resource configuration and a soft resource configuration. For details, refer to the foregoing unavailable resource configuration method. Details are not described herein again.

In a possible implementation, the first resource configuration and the second resource configuration include only a configuration of a DU resource type (for example, D/U/F), and therefore may also be referred to as a first resource type configuration and a second resource type configuration. An attribute corresponding to the DU resource type may be configured through additional resource attribute. A resource attribute in this embodiment of this application may include but is not limited to hard, soft, and unavailable (not applicable, NA).

In this application, the attribute corresponding to the DU resource type may be configured for each type of resource in one time domain resource. Specifically, the donor node may configure a different resource attribute for each type of resource in one time domain resource (for example, one slot). For example, assuming that one slot includes X downlink symbols, Y flexible symbols, and Z uplink symbols, the donor may independently configure corresponding resource attributes for the downlink, flexible, and uplink symbols. For example, a resource attribute configured for the downlink symbol is hard, a resource attribute configured for the flexible symbol is soft, and a resource attribute configured for the uplink symbol is unavailable.

Generally, a resource attribute configuration corresponding to the DU resource type in the IAB node also has a configuration periodicity. Optionally, a resource attribute configuration periodicity is M times a resource type configuration periodicity, and M is an integer greater than or equal to 1. Optionally, in some embodiments, $M=2^m$, where $m=0, 1, 2, \ldots$. Specifically, for example, in a possible implementation, the donor may indicate, in configuration signaling, an extension multiple of the resource attribute configuration periodicity relative to the resource type configuration periodicity, that is, indicate a value of M or a value of m. In another possible implementation, a protocol specifies that the DU of the IAB node does not expect to receive a configuration that does not have the foregoing periodic relationship, or the IAB node considers, as an incorrect configuration, a configuration that does not have the foregoing periodic relationship.

Resource attributes are configured by resource type. A resource attribute of a symbol is determined based on the following conditions: an attribute configuration of a slot of the symbol and a resource type of the symbol. For example, one slot may have the following attribute configuration: {uplink symbol attribute, downlink symbol attribute, flexible symbol attribute}. When a DU cell of the IAB has a first resource type configuration and a second resource type configuration, a symbol may be indicated as different resource types by the first resource type configuration and the second resource type configuration, and in this case, the symbol may not have a unique attribute. Because the upper-level node performs conflict avoidance based on an attribute of a DU resource of the IAB node, a non-unique attribute of the DU resource on the IAB may cause a conflict between an MT resource and the DU resource.

To resolve the foregoing problem, one method is to associate a resource attribute configuration with a specific resource configuration. For example, the resource attribute configuration is associated with the first resource (type) configuration. Alternatively, the donor node indicates, by using signaling, a resource (type) configuration associated with the resource attribute configuration.

After the resource attribute configuration is associated with the specific resource (type) configuration, the IAB node and the upper-level node determine an attribute of the DU resource of the IAB node based on the resource attribute configuration and the associated resource type configuration, and may perform conflict avoidance of backhaul link transmission based on the resource attribute configuration and the associated resource type configuration. Therefore, both the IAB node and the upper-level node of the IAB node need to learn of the resource type configuration associated with the resource attribute configuration. Optionally, the donor node may provide, for only the upper-level node of the IAB node, the resource type configuration that is associated with the resource attribute configuration and that is of the DU (each cell) of the IAB node, instead of all resource type configurations of the DU (each cell) of the IAB node.

In another possible implementation, the resource attribute configuration of the IAB node is associated with a plurality of resource type configurations. In this case, the IAB node and the upper-level node perform conflict avoidance of backhaul link transmission based on the resource attribute configuration and the plurality of associated resource configurations. When the resource attribute configuration is associated with the plurality of resource type configurations, a resource type of each symbol is a combination of the plurality of resource type configurations, and the resource attribute configuration is associated with the combined resource type configurations.

In another possible implementation, the donor node provides a plurality of resource attribute configurations for the IAB node, and the plurality of resource attribute configurations are respectively associated with a plurality of resource configurations. For example, the donor node provides a first resource attribute configuration and a second resource attribute configuration for the IAB node, and the first resource attribute configuration and the second resource attribute configuration are respectively associated with the first resource type configuration and the second resource type configuration.

If the donor node provides a plurality of DU resource configurations of the DU of the IAB node for the upper-level node of the IAB node, the upper-level node needs to learn of an association relationship between the resource attribute configuration and the resource type configuration of the IAB node. The association relationship may be provided by the donor node for the upper-level node, or may be reported by the IAB node to the upper-level node.

As described above, availability of a soft resource of the DU of the IAB node needs to be indicated by the upper-level node, and the upper-level node also indicates the availability of the soft resource by slot by resource type. Specifically, the upper-level node may indicate one or more of the following eight available states for one slot of the DU of the IAB node:

| Value | Meaning |
|---|---|
| 0 | All resources are unavailable |
| 1 | A downlink resource is available |
| 2 | An uplink resource is available |
| 3 | Downlink and uplink resources are available |
| 4 | A flexible resource is available |
| 5 | Downlink and flexible resources are available |
| 6 | Uplink and flexible resources are available |
| 7 | All resources are available |

In a possible implementation, an indication for the availability of the soft resource of the DU of the IAB node performed by the upper-level node also needs to be associated with a resource type configuration of the IAB node. For example, the indication for the availability of the soft resource of the DU of the IAB node is associated with the first resource type configuration. An association relationship between a dynamic indication and a resource configuration may be defined by a protocol. For example, the dynamic indication is associated with the first resource type configuration, or may be configured by the donor node, or may be configured by the upper-level node. Herein, that the dynamic indication is associated with the resource configuration means that the IAB node determines availability of an indicated slot resource based on dynamic indication content and the associated resource configuration. Optionally, that the dynamic indication is associated with one DU resource configuration means that the IAB node and the upper-level node determine a backhaul link resource by using the dynamic indication and the associated resource configuration, and does not mean that the DU of the IAB node cannot communicate with the lower-level node by using an unassociated resource configuration.

In a possible implementation, the dynamic indication and the resource attribute configuration are associated with a same resource type configuration. In this case, a resource conflict avoidance principle is as follows: Receiving and sending of the MT of the IAB node on the backhaul link should not affect receiving and sending of available resources of each cell of the DU of the IAB node. The available resources of each cell of the DU of the IAB node are a hard resource indicated by the resource attribute configuration and a soft resource indicated as being available by dynamic signaling. The IAB node and the upper-level node of the IAB node determine an available resource of the MT of the IAB node based on the resource attribute configuration, the dynamic signaling, and a resource configuration associated with the resource attribute configuration and the dynamic signaling. If the DU of the IAB node needs to use an unassociated resource type configuration for transmission, the available resource of the MT determined in the foregoing process should not be affected.

Optionally, when the IAB node has a plurality of semi-static resource attribute configurations and resource type configurations, the dynamic signaling indicates only one resource attribute configuration and an associated resource type configuration. Optionally, the upper-level node configures the resource attribute configuration indicated by the dynamic signaling.

Optionally, in some embodiments, after obtaining the first resource configuration and/or the second resource configuration, the DU of the first node may further generate a child node resource configuration based on the first resource configuration and/or the second resource configuration, and send the child node resource configuration to a child node.

It should be noted that the child node resource configuration sent by the DU of the first node does not necessarily need to entirely match the first resource configuration and/or the second resource configuration of the first node. For example, for a time domain resource, when the first resource configuration and/or the second resource configuration are/is set to F, the time domain resource in the child node resource configuration generated by the DU of the first node may be set to any one of D, U, or F. In addition, different child nodes may have different configurations. For another example, for a time domain resource, when the first resource configuration and/or the second resource configuration are/is set to D(U), the time domain resource in the child node resource configuration generated by the DU of the first node may be set to any one of D(U) or F.

Optionally, in some embodiments, the child node resource configuration may be generated by a parent node or a donor node of the first node, that is, the parent node or the donor node of the first node may separately generate the DU resource configuration (for example, the first resource configuration and/or the second resource configuration) of the first node and the child node resource configuration. Herein, the DU resource configuration of the first node and the child node resource configuration that are generated by the parent node or the donor node of the first node should match each other, that is, the DU of the first node does not expect to receive the DU resource configuration and the child node resource configuration that conflict. Alternatively, when the DU resource configuration received by the DU of the first node conflicts with the child node resource configuration in a slot, the DU of the first node considers that the slot is unavailable. Herein, the conflicting resource configuration means that the DU resource configuration is reverse to the child node resource configuration, that is, one is set to D, and the other is set to U.

It should be noted that, for a time domain resource, when the DU resource configuration of the first node is reverse to the child node resource configuration, D of the first node cannot communicate with a related child node on the resource.

It may be understood that, in the resource configuration method in the embodiments of this application, steps implemented by the first node may also be implemented by a component (for example, a chip or a circuit) that can be used in the first node.

The foregoing describes in detail the resource configuration method side embodiments provided in the embodiments of this application with reference to FIG. 1 to FIG. 15. The following describes in detail apparatus embodiments of this application with reference to FIG. 16 and FIG. 17. It should be understood that the descriptions of the method embodiments correspond to descriptions of the apparatus embodiments. Therefore, for parts that are not described in detail, refer to the foregoing method embodiments.

Figure 16:
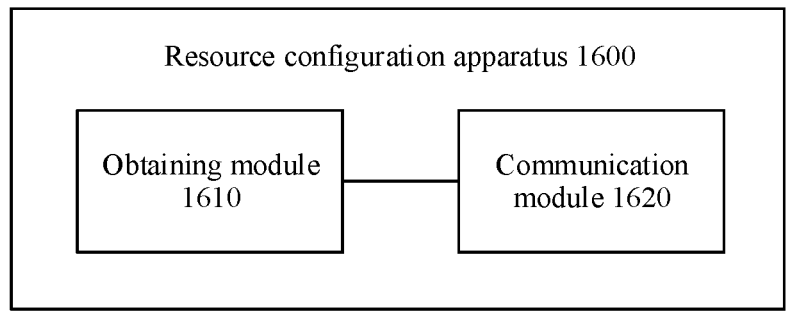
FIG. 16 is a schematic block diagram of a resource configuration apparatus 1600 according to an embodiment of this application.

FIG. 16 is a schematic block diagram of a resource configuration apparatus 1600 according to an embodiment of this application. It may be understood that the resource configuration apparatus 1600 may be a first node, or may be a component that can be used in the first node.

The resource configuration apparatus 1600 includes:

an obtaining module 1610, configured to obtain a first resource configuration and at least one second resource configuration, where the first resource configuration is used to indicate a DU side of the first node to communicate with a terminal device and/or a second node by using the first resource configuration, the second resource configuration is used to indicate the DU side of the first node to communicate with the second node by using the second resource configuration, the first node is a relay node, and the second node is a child node of the first node; and a communication module 1620, configured to communicate with the terminal device and/or the second node.

The foregoing resource configuration apparatus may obtain at least two DU resource configurations, and different DU resource configurations correspond to different users. Different user types are distinguished by using different resource configurations, so that the DU of the first node uses appropriate resource configurations when communicating with different users. In addition to supporting a function of multiplexing a plurality of resources, compatibility with existing UE may further be ensured.

Optionally, in some embodiments, the communication module 1620 is specifically configured to perform one or more of the following: communicating with the terminal device in a first time unit based on the first resource configuration; communicating with the terminal device and/or the second node in the first time unit based on the first resource configuration; and communicating with the second node in the first time unit based on the second resource configuration.

Optionally, in some embodiments, a correspondence between the first time unit and the first resource configuration or the second resource configuration is preconfigured in advance.

Optionally, in some embodiments, the obtaining module 1610 is specifically configured to receive the at least one second resource configuration sent by a third node, where the third node is a parent node or a donor node of the first node.

Optionally, in some embodiments, the obtaining module 1610 is specifically configured to receive first indication information from a third node, where the first indication information is used to indicate the DU side of the first node to modify a resource type in the first resource configuration.

Optionally, in some embodiments, the obtaining module 1610 is specifically configured to: modify an uplink resource type in the first resource configuration to a downlink resource type or a flexible resource type based on the first indication information; modify a downlink resource type in the first resource configuration to an uplink resource type or a flexible resource type; or modify a flexible resource type in the first resource configuration to an uplink resource type or a downlink resource type.

Optionally, in some embodiments, the first indication information is further used to indicate to extend a configuration periodicity of the first resource configuration.

Optionally, in some embodiments, the obtaining module 1610 is specifically configured to: extend the configuration periodicity of the first resource configuration based on the first indication information; and modify a resource type in an extended first resource configuration.

Optionally, in some embodiments, the obtaining module 1610 is specifically configured to receive second indication information from the third node, where the second indication information is used to indicate the DU side of the first node to modify a resource type in a received original first resource configuration to an unavailable resource.

Alternatively, the obtaining module 1610 is specifically configured to receive third indication information from the third node, where the third indication information is used to indicate the DU side of the first node to modify a resource type in at least one received original second resource configuration to an unavailable resource.

Optionally, in some embodiments, the second indication information is further used to indicate to extend a configuration periodicity of the received original first resource configuration, and the third indication information is further used to indicate to extend a configuration periodicity of the received original second resource configuration.

Optionally, in some embodiments, the apparatus 1600 further includes:

a sending module, configured to send a child node resource configuration to the terminal device and/or the second node, where the child node configuration is generated by the DU side of the first node based on the first resource configuration and/or the second resource configuration.

Optionally, in some embodiments, the communication module 1620 is specifically configured to: select, based on a user in a first user group, the first resource configuration to communicate with the user in the first user group, where the first user group includes the terminal device and/or the second node; or select, based on a user in a first user group, the second resource configuration to communicate with the user in the first user group, where the second user group includes only the second node.

Optionally, in some embodiments, the DU side of the first node includes N cells, the second resource configuration is configured for M cells, and M is a positive integer less than or equal to N.

Figure 17:
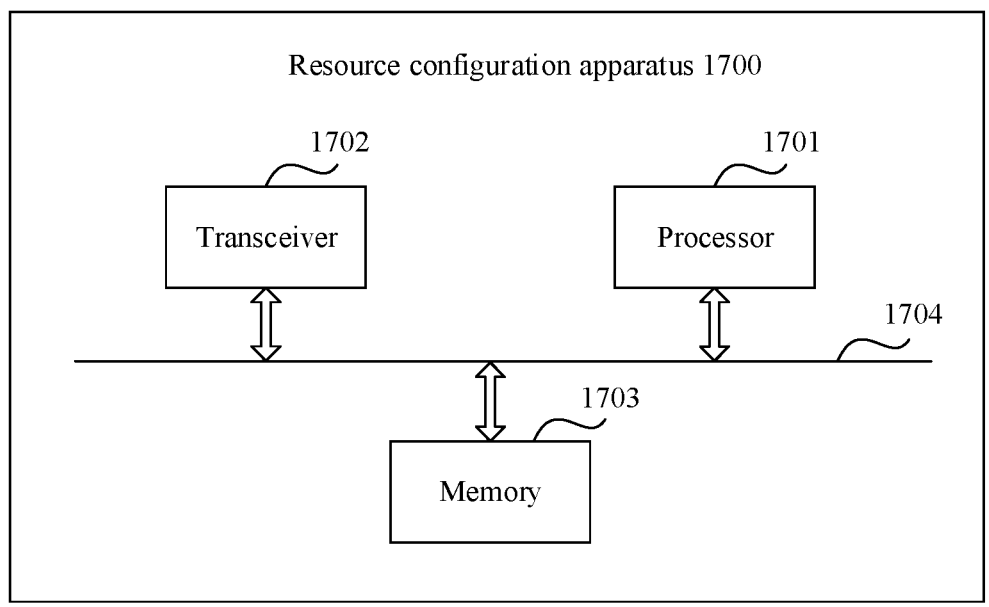
FIG. 17 is a schematic block diagram of a resource configuration apparatus 1700 according to an embodiment of this application.

FIG. 17 is a schematic block diagram of a resource configuration apparatus 1700 according to an embodiment of this application. The resource configuration apparatus 1700 may include a processor 1701, a transceiver 1702, and a memory 1703.

The processor 1701 may be connected to the memory 1703. The memory 1703 may be configured to store program code and data of the resource configuration apparatus 1700. Therefore, the memory 1703 may be a storage unit in the processor 1701, an external storage unit independent of the processor 1701, or a component including a storage unit in the processor 1701 and an external storage unit independent of the processor 1701.

Optionally, the resource configuration apparatus 1700 may further include a bus 1704. The memory 1703 may be connected to the processor 1701 by using the bus 1704. The bus 1704 may be a peripheral component interconnect (PCI) bus, an extended industry standard architecture (EISA) bus, or the like. The bus 1704 may be classified into an address bus, a data bus, a control bus, and the like. For ease of representation, only one thick line is used to represent the bus in FIG. 17, but this does not mean that there is only one bus or only one type of bus.

The processor 1701 may include but is not limited to at least one of the following computing devices that run various types of software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions. The processor may be an independent semiconductor chip, or may be integrated with another circuit to constitute a semiconductor chip. For example, the processor may constitute a system on chip with another circuit (for example, an encoding/decoding circuit, a hardware acceleration circuit, or various bus and interface circuits). Alternatively, the processor may be integrated into an application specific integrated circuit (ASIC) as a built-in processor of the ASIC, and the ASIC integrated with the processor may be independently packaged or may be packaged with another circuit. The processor includes a core configured to perform an operation or processing by executing software instructions, and may further include a necessary hardware accelerator, for example, a field programmable gate array (FPGA), a programmable logic device (PLD), or a logic circuit that implements a dedicated logic operation.

When executing a program, the processor 1701 is configured to:

obtain, by a distributed unit (DU) side of a first node, a first resource configuration and at least one second resource configuration, where the first resource configuration is used to indicate a DU side of a first node to communicate with a terminal device and/or a second node by using the first resource configuration, the second resource configuration is used to indicate the DU side of the first node to communicate with the second node by using the second resource configuration, the first node is a relay node, and the second node is a child node of the first node; and communicate, by the DU side of the first node, with the terminal device and/or the second node.

In the foregoing technical solution, the DU of the first node may obtain at least two DU resource configurations, and different DU resource configurations correspond to different users. Different user types are distinguished by using different resource configurations, so that the DU of the first node uses appropriate resource configurations when communicating with different users. In addition to supporting a function of multiplexing a plurality of resources, compatibility with existing UE may further be ensured.

Optionally, in some embodiments, that the DU side of the first node communicates with the terminal device and/or the second node includes one or more of the following: the DU side of the first node communicates with the terminal device in a first time unit based on the first resource configuration; the DU side of the first node communicates with the terminal device and/or the second node in the first time unit based on the first resource configuration; and the DU side of the first node communicates with the second node in the first time unit based on the second resource configuration.

Optionally, in some embodiments, a correspondence between the first time unit and the first resource configuration or the second resource configuration is preconfigured in advance.

Optionally, in some embodiments, the DU side of the first node receives the at least one second resource configuration sent by a third node, where the third node is a parent node or a donor node of the first node.

Optionally, in some embodiments, the DU side of the first node receives the first resource configuration sent by the third node.

In another possible implementation, the DU side of the first node receives first indication information from a third node, where the first indication information is used to indicate the DU side of the first node to modify a resource type in the first resource configuration.

Optionally, in some embodiments, the DU side of the first node modifies an uplink resource type in the first resource configuration to a downlink resource type or a flexible resource type based on the first indication information; modifies a downlink resource type in the first resource configuration to an uplink resource type or a flexible resource type; or modifies a flexible resource type in the first resource configuration to an uplink resource type or a downlink resource type.

Optionally, in some embodiments, the first indication information is further used to indicate to extend a configuration periodicity of the first resource configuration.

Optionally, in some embodiments, the DU side of the first node extends the configuration periodicity of the first resource configuration based on the first indication information, and the DU side of the first node modifies a resource type in an extended first resource configuration.

Optionally, in some embodiments, the DU side of the first node receives second indication information from the third node, where the second indication information is used to indicate the DU side of the first node to modify a resource type in a received original first resource configuration to an unavailable resource. Alternatively, the DU side of the first node receives third indication information from the third node, where the third indication information is used to indicate the DU side of the first node to modify a resource type in at least one received original second resource configuration to an unavailable resource.

Optionally, in some embodiments, the second indication information is further used to indicate to extend a configuration periodicity of the received original first resource configuration, and the third indication information is further used to indicate to extend a configuration periodicity of the received original second resource configuration.

Optionally, in some embodiments, the method further includes: The DU side of the first node sends a child node resource configuration to the terminal device and/or the second node, where the child node configuration is generated by the DU side of the first node based on the first resource configuration and/or the second resource configuration.

Optionally, in some embodiments, the DU side of the first node selects, based on a user in a first user group, the first resource configuration to communicate with the user in the first user group, where the first user group includes the terminal device and/or the second node. Alternatively, the DU side of the first node selects, based on a user in a first user group, the second resource configuration to communicate with the user in the first user group, where the second user group includes only the second node.

Optionally, in some embodiments, the DU side of the first node includes N cells, the second resource configuration is configured for M cells, and M is a positive integer less than or equal to N.

It may be understood that, for functions and corresponding operations of the modules of the resource configuration apparatus in this embodiment of this application, refer to related descriptions in the method embodiments. In addition, the module in this embodiment of this application may also be referred to as a unit, a circuit, or the like. This is not limited in this embodiment of this application.

It may be understood that the resource configuration apparatus may perform some or all of the steps in the foregoing embodiments. These steps or operations are merely examples. In this embodiment of this application, other operations or variations of various operations may be further performed. In addition, the steps may be performed in a sequence different from that presented in the foregoing embodiments, and not all the operations in the foregoing embodiments are necessarily performed.

An embodiment of this application further provides a computer-readable medium, configured to store a computer program. The computer program includes instructions used to perform the method in any possible implementation of any one of the foregoing aspects.

An embodiment of this application further provides a computer program product, used in a resource configuration apparatus. The computer program product includes computer program code. When the computer program code is run on a computer, the computer is enabled to perform the method in any possible implementation of any one of the foregoing aspects.

An embodiment of this application further provides a chip system, used in a resource configuration apparatus. The chip system includes: at least one processor, at least one memory, and an interface circuit. The interface circuit is responsible for information exchange between the chip system and an external environment. The at least one memory, the interface circuit, and the at least one processor are connected to each other by using a line. The at least one memory stores instructions. The instructions are executed by the at least one processor to perform operations in the methods in the foregoing aspects. The at least one memory is optional.

A resource configuration method provided in the embodiments of this application may be applied to a relay node. The relay node includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). An operating system may be any one or more of computer operating systems implementing service processing through a process, for example, a Linux operating system, a Unix operating system, an Android operating system, an iOS operating system, and a Windows operating system. The application layer includes applications such as a browser, an address book, word processing software, and instant messaging software.

In addition, aspects or features in the embodiments of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to radio channels and various other media that can store, include, and/or carry instructions and/or data.

In addition, the terms "system" and "network" may be used interchangeably in this specification. The term "and/or" in this specification describes only an association relationship between associated objects and represents that there may be three relationships. For example, A and/or B may represent the following three cases: Only A exists, both A and B exist, and only B exists. In addition, the character "/" in this specification usually indicates an "or" relationship between the associated objects.

It should be understood that in the embodiments of this application, "B corresponding to A" indicates that B is associated with A, and B may be determined according to A. However, it should further be understood that determining A according to B does not mean that B is determined according to A only; that is, B may also be determined according to A and/or other information.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, including one or more usable media that are integrated. The usable medium may be a magnetic medium (for example, a floppy disk, a hard disk, or a magnetic tape), an optical medium (for example, a digital video disc (DVD)), a semiconductor medium (for example, a solid-state drive (solid state disk, SSD)), or the like.

A person of ordinary skill in the art may be aware that, with reference to the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions in this embodiment.

In addition, functional units in this embodiment of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A resource configuration method, wherein the method comprises:
    obtaining, by a distributed unit (DU) side of a first node, a first resource configuration and at least one second resource configuration, wherein the first resource configuration indicates the DU side of the first node to communicate with at least one of a terminal device or a second node by using the first resource configuration, the second resource configuration indicates the DU side of the first node to communicate with the second node by using the second resource configuration, the first node is a relay node, and the second node is a child node of the first node; and
    communicating, by the DU side of the first node, with the at least one of the terminal device or the second node, wherein:
    obtaining, by the DU side of the first node, the first resource configuration comprises receiving, by the DU side of the first node, second indication information from a third node, wherein the second indication information indicates the DU side of the first node to modify a resource type in a received original first resource configuration to an unavailable resource; or
    obtaining, by the DU side of the first node, the at least one second resource configuration comprises receiving, by the DU side of the first node, third indication information from the third node, wherein the third indication information indicates the DU side of the first node to modify a resource type in at least one received original second resource configuration to an unavailable resource.

2. The method according to claim 1, wherein communicating, by the DU side of the first node, with the at least one of the terminal device or the second node comprises one or more of the following:
    communicating, by the DU side of the first node, with the terminal device in a first time unit based on the first resource configuration;
    communicating, by the DU side of the first node, with the at least one of the terminal device or the second node in the first time unit based on the first resource configuration; or
    communicating, by the DU side of the first node, with the second node in the first time unit based on the second resource configuration.

3. The method according to claim 2, wherein a correspondence between the first time unit and the first resource configuration or the second resource configuration is preconfigured.

4. The method according to claim 1, wherein obtaining, by the DU side of the first node, the at least one second resource configuration comprises:
    receiving, by the DU side of the first node, the at least one second resource configuration sent by the third node, wherein the third node is a parent node or a donor node of the first node.

5. The method according to claim 1, wherein obtaining, by the DU side of the first node, the at least one second resource configuration comprises:
receiving, by the DU side of the first node, first indication information from the third node, wherein the first indication information indicates the DU side of the first node to modify a resource type in the first resource configuration.

6. The method according to claim 5, wherein obtaining, by the DU side of the first node, the at least one second resource configuration comprises:
modifying, by the DU side of the first node, an uplink resource type in the first resource configuration to a downlink resource type or a flexible resource type based on the first indication information;
modifying a downlink resource type in the first resource configuration to an uplink resource type or a flexible resource type; or
modifying a flexible resource type in the first resource configuration to an uplink resource type or a downlink resource type.

7. The method according to claim 5, wherein the first indication information indicates to increase a time interval of configuring the first resource configuration.

8. The method according to claim 1, wherein the method further comprises:
generating, by the DU side of the first node, a child node resource configuration based on the at least one of the first resource configuration or the second resource configuration; and
sending, by the DU side of the first node, the child node resource configuration to the at least one of the terminal device or the second node.

9. The method according to claim 1, wherein communicating, by the DU side of the first node, with the at least one of the terminal device or the second node comprises:
selecting, by the DU side of the first node based on a user in a first user group, the first resource configuration to communicate with the user in the first user group, wherein the first user group comprises the at least one of the terminal device or the second node; or
selecting, by the DU side of the first node based on a user in a first user group, the second resource configuration to communicate with the user in the first user group, wherein a second user group comprises only the second node.

10. An apparatus, comprising:
a non-transitory memory storage comprising instructions; and
one or more processors in communication with the non-transitory memory storage, wherein the instructions, when executed by the one or more processors, cause the apparatus to:
obtain a first resource configuration and at least one second resource configuration, wherein the first resource configuration indicates a distributed unit (DU) side of a first node to communicate with at least one of a terminal device or a second node by using the first resource configuration, the second resource configuration indicates the DU side of the first node to communicate with the second node by using the second resource configuration, the first node is a relay node, and the second node is a child node of the first node; and
communicate with the at least one of the terminal device or the second node, wherein the instructions, when executed by the one or more processors, cause the apparatus to:
receive second indication information from a third node, wherein the second indication information indicates the DU side of the first node to modify a resource type in a received original first resource configuration to an unavailable resource; or
receive third indication information from the third node, wherein the third indication information indicates the DU side of the first node to modify a resource type in at least one received original second resource configuration to an unavailable resource.

11. The apparatus according to claim 10, wherein the instructions, when executed by the one or more processors, cause the apparatus to:
communicate with the terminal device in a first time unit based on the first resource configuration;
communicate with the at least one of the terminal device or the second node in the first time unit based on the first resource configuration; or
communicate with the second node in the first time unit based on the second resource configuration.

12. The apparatus according to claim 11, wherein a correspondence between the first time unit and the first resource configuration or the second resource configuration is preconfigured.

13. The apparatus according to claim 10, wherein the instructions, when executed by the one or more processors, cause the apparatus to:
receive the at least one second resource configuration sent by the third node, wherein the third node is a parent node or a donor node of the first node.

14. The apparatus according to claim 10, wherein the instructions, when executed by the one or more processors, cause the apparatus to:
receive first indication information from the third node, wherein the first indication information indicates the DU side of the first node to modify a resource type in the first resource configuration.

15. The apparatus according to claim 14, wherein the instructions, when executed by the one or more processors, cause the apparatus to:
modify an uplink resource type in the first resource configuration to a downlink resource type or a flexible resource type based on the first indication information;
modify a downlink resource type in the first resource configuration to an uplink resource type or a flexible resource type; or
modify a flexible resource type in the first resource configuration to an uplink resource type or a downlink resource type.

16. The apparatus according to claim 14, wherein the first indication information indicates to increase a time interval for configuring the first resource configuration.

17. The apparatus according to claim 10, wherein the instructions, when executed by the one or more processors, cause the apparatus to:
generate a child node resource configuration based on the at least one of the first resource configuration or the second resource configuration; and
send the child node resource configuration to the at least one of the terminal device or the second node.

18. The apparatus according to claim 10, wherein the instructions, when executed by the one or more processors, cause the apparatus to:
- select, based on a user in a first user group, the first resource configuration to communicate with the user in the first user group, wherein the first user group comprises the at least one of the terminal device or the second node; or
- select, based on a user in a first user group, the second resource configuration to communicate with the user in the first user group, wherein the second user group comprises only the second node.

* * * * *